(12) United States Patent
Liu et al.

(10) Patent No.: US 11,227,215 B2
(45) Date of Patent: Jan. 18, 2022

(54) QUANTIFYING VULNERABILITIES OF DEEP LEARNING COMPUTING SYSTEMS TO ADVERSARIAL PERTURBATIONS

(71) Applicant: International Business Machines Corporation, Armonk, NY (US)

(72) Inventors: Sijia Liu, Somerville, MA (US); Quanfu Fan, Lexington, MA (US); Chuang Gan, Cambridge, MA (US); Dakuo Wang, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 16/296,897

(22) Filed: Mar. 8, 2019

(65) Prior Publication Data

US 2020/0285952 A1 Sep. 10, 2020

(51) Int. Cl.
*G06N 3/08* (2006.01)
*G06N 20/00* (2019.01)

(52) U.S. Cl.
CPC .............. *G06N 3/08* (2013.01); *G06N 20/00* (2019.01)

(58) Field of Classification Search
CPC ........ G06N 3/08; G06N 20/00; G06N 3/0454; G06F 21/55
See application file for complete search history.

(56) References Cited

U.S. PATENT DOCUMENTS

2017/0316281 A1 11/2017 Criminisi et al.
2018/0005136 A1 1/2018 Gai et al.

FOREIGN PATENT DOCUMENTS

WO WO2018/085697 A1 5/2018

OTHER PUBLICATIONS

Bolei Zhou, David Bau, Aude Oliva, and Antonio Torralba. Interpreting deep visual representations via network dissection. PAMI, 2018a https://arxiv.org/pdf/1711.05611.pdf (Year: 2018).*

(Continued)

*Primary Examiner* — Brian M Smith
*Assistant Examiner* — Michael H Hoang
(74) *Attorney, Agent, or Firm* — Stephen J. Walder, Jr.; Jeffrey S. LaBaw

(57) ABSTRACT

Mechanisms are provided for generating an adversarial perturbation attack sensitivity (APAS) visualization. The mechanisms receive a natural input dataset and a corresponding adversarial attack input dataset, where the adversarial attack input dataset comprises perturbations intended to cause a misclassification by a computer model. The mechanisms determine a sensitivity measure of the computer model to the perturbations in the adversarial attack input dataset based on a processing of the natural input dataset and corresponding adversarial attack input dataset by the computer model. The mechanisms generate a classification activation map (CAM) for the computer model based on results of the processing and a sensitivity overlay based on the sensitivity measure. The sensitivity overlay graphically represents different classifications of perturbation sensitivities. The mechanisms apply the sensitivity overlay to the CAM to generate and output a graphical visualization output of the computer model sensitivity to perturbations of adversarial attacks.

20 Claims, 7 Drawing Sheets
(5 of 7 Drawing Sheet(s) Filed in Color)

(56) References Cited

OTHER PUBLICATIONS

Wang, Jingyi, et al. "Detecting adversarial samples for deep neural networks through mutation testing." arXiv preprint arXiv: 1805.05010 (2018). https://arxiv.org/abs/1805.05010 (Year: 2018).*

Fong, Ruth C., and Andrea Vedaldi. "Interpretable explanations of black boxes by meaningful perturbation." Proceedings of the IEEE International Conference on Computer Vision. 2017. https://openaccess.thecvf.com/content_iccv_2017/html/Fong_Interpretable_Explanations_of_ICCV_2017_paper.html (Year: 2017).*

Athalye, Anish et al., "Obfuscated Gradients Give a False Sense of Security: Circumventing Defenses to Adversarial Examples", arXiv: 1802.00420v4 [cs.LG] Jul. 31, 2018, 12 pages.

Carlini, Nicholas et al., "Adversarial Examples Are Not Easily Detected: Bypassing Ten Detection Methods", AISec '17: Proceedings of the 10th ACM Workshop on Artificial Intelligence and Security, Nov. 2017, 12 pages.

Carlini, Nicholas et al., "Towards Evaluating the Robustness of Neural Networks", The Thirty-Third AAAI Conference on Artificial Intelligence (AAAI-19), Jan. 27-Feb. 1, 2019, 19 pages.

Chen, Pin-Yu et al., "EAD: Elastic-Net Attacks to Deep Neural Networks via Adversarial Examples", The Thirty-Second AAAI Conference on Artificial Intelligence (AAAI-18), Feb. 2018, 8 pages.

Goodfellow, Ian J. et al., "Explaining and Harnessing Adversarial Examples", ICLR 2015 : International Conference on Learning Representations 2015, May 2015, 11 pages.

He, Kaiming et al., "Deep Residual Learning for Image Recognition", CVPR 2016, Conference on Computer Vision and Pattern Recognition, Jun. 26, 2016-Jul. 1, 2016, 9 pages.

Kurakin, Alexey et al., "Adversarial Machine Learning at Scale", ICLR 2017 5th International Conference on Learning Representations, Apr. 24-26, 2017, 17 pages.

Madry, Aleksander et al., "Towards Deep Learning Models Resistant to Adversarial Attacks", Cornell University Library, arXiv: 1706.06083v3 [stat.ML], Nov. 9, 2017, pp. 1-27.

Moosavi-Dezfooli, Seyed-Mohsen et al., "DeepFool: a simple and accurate method to fool deep neural networks", In IEEE Conference on Computer Vision and Pattern Recognition, Jun. 2016, 2574-2582.

Papernot, Nicolas et al., "Distillation as a Defense to Adversarial Perturbations against Deep Neural Networks", Accepted to the 37th IEEE Symposium on Security & Privacy, IEEE, 2016, arXiv: 1511.04508v2 [cs.CR], Mar. 14, 2016, pp. 1-16.

Papernot, Nicolas et al., "The limitations of deep learning in adversarial settings", 2016 IEEE European Symposium on Security and Privacy (EuroS&P), Mar. 2016, 16 pages.

Sinha, Aman et al., "Certifying Some Distributional Robustness with Principled Adversarial Training", ICLR 2018 Sixth International Conference on Learning Representations, Apr. 30 through May 3, 2018, 34 pages.

Szegedy, Christian et al., "Rethinking the Inception Architecture for Computer Vision", Proceedings of the IEEE Conference on Computer Vision and Pattern Recognition, Jun. 2016, 10 pages.

Weng, Tsui-Wei et al., "Evaluating the Robustness of Neural Net-Works: An Extreme Value Theory Approach", ICLR 2018 Sixth International Conference on Learning Representations, Apr. 30 through May 3, 2018, 18 pages.

Xiao, Chaowei et al., "Spatially Transformed Adversarial Examples", arXiv:1801.02612v2 [cs.CR] Jan. 9, 2018, 29 pages.

Xu, Kaidi et al., "Structured Adversarial Attack: Towards General Implementation and Better Interpretability", ICLR | 2019 Seventh International Conference on Learning Representations, May 2019, 19 pages.

Yu, Fuxun et al., "ASP:A Fast Adversarial Attack Example Generation Framework based on Adversarial Saliency Prediction", arXiv:1802.05763v3 [cs.CV] Jun. 12, 2018, 6 pages.

Yuan, Ming et al., "Model selection and estimation in regression with grouped variables", Journal of the Royal Statistical Society: Series B (Statistical Methodology) 68(1): Feb. 2006,19 pages.

Zhou, Bolei et al., "Learning Deep Features for Discriminative Localization", CVPR 2016, Conference on Computer Vision and Pattern Recognition, Jun. 26, 2016-Jul. 1, 2016, 9 pages.

High, Rob, "The Era of Cognitive Systems: An Inside Look at IBM Watson and How it Works", IBM Corporation, Redbooks, Dec. 12, 2012, 16 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

* cited by examiner adv. example distortion heat map

| attack | model | $\ell_0$ | | $\ell_1$ | | $\ell_2$ | | $\ell_\infty$ | | ASR |
|---|---|---|---|---|---|---|---|---|---|---|
| | | original ($\delta$) | refine ($\delta_g$) | original | refine | original | refine | original | refine | refine |
| IFGSM | Resnet | 266031 | 61055 | 1122.56 | 176.08 | 2.625 | 1.87 | 0.017 | 0.035 | 96.7% |
| | Incep. | 266026 | 59881 | 812.94 | 153.89 | 1.926 | 1.22 | 0.019 | 0.033 | 100% |
| C&W | Resnet | 268117 | 21103 | 183.65 | 134.26 | 0.697 | 0.727 | 0.028 | 0.029 | 100% |
| | Incep. | 268123 | 22495 | 144.84 | 96.78 | 0.680 | 0.673 | 0.028 | 0.034 | 100% |
| EAD | Resnet | 66584 | 20147 | 42.57 | 63.28 | 1.529 | 1.233 | 0.234 | 0.096 | 100% |
| | Incep. | 69877 | 18853 | 38.17 | 45.88 | 1.299 | 1.107 | 0.229 | 0.083 | 100% |
| Str | Resnet | 30823 | 18744 | 119.76 | 110.54 | 1.259 | 1.132 | 0.105 | 0.087 | 100% |
| | Incep. | 27823 | 19067 | 86.35 | 82.33 | 1.174 | 0.985 | 0.103 | 0.072 | 100% |

QUANTIFYING VULNERABILITIES OF DEEP LEARNING COMPUTING SYSTEMS TO ADVERSARIAL PERTURBATIONS

BACKGROUND

The present application relates generally to an improved data processing apparatus and method and more specifically to mechanisms for quantifying vulnerabilities of deep learning computing systems to adversarial perturbations.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts.

Neural network based deep learning is a class of machine learning algorithms that use a cascade of many layers of nonlinear processing units for feature extraction and transformation. Each successive layer uses the output from the previous layer as input. The algorithms may be supervised or unsupervised and applications include pattern analysis (unsupervised) and classification (supervised). Neural network based deep learning is based on the learning of multiple levels of features or representations of the data with higher level features being derived from lower level features to form a hierarchical representation. The composition of a layer of nonlinear processing units of the neural network used in a deep learning algorithm depends on the problem to be solved. Layers that have been used in deep learning include hidden layers of an artificial neural network and sets of complicated propositional formulas. They may also include latent variables organized layer-wise in deep generative models such as the nodes in deep belief networks and deep Boltzmann machines.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions which are executed by the at least one processor to specifically configure the at least one processor to implement an adversarial perturbation attack sensitivity (APAS) visualization system. The method comprises receiving, by the APAS visualization system implemented by the at least one processor, a natural input dataset and a corresponding adversarial attack input dataset for evaluation by the APAS visualization system. Data structures of the adversarial attack input dataset comprise perturbations intended to cause a misclassification by a computer model. The method further comprises determining, by the APAS visualization system, at least one sensitivity measure of the computer model to the perturbations in the adversarial attack input dataset based on a processing of the natural input dataset and corresponding adversarial attack input dataset by the computer model. Moreover, the method comprises generating, by the APAS visualization system, a classification activation map (CAM) for the computer model based on results of the processing of the natural input dataset and adversarial attack input dataset, and generating, by the APAS visualization system, a sensitivity overlay based on the at least one sensitivity measure. The sensitivity overlay graphically represents different classifications of perturbation sensitivities. In addition, the method comprises applying, by the APAS visualization system, the sensitivity overlay to the CAM to generate a graphical visualization output of the computer model sensitivity to perturbations of adversarial attacks, and outputting, by the APAS visualization system, the graphical visualization output to a user computing device for visual display to a user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
FIGS. 1A-1E illustrate an adversarial input together with its adversarial perturbations generated by a Carlini and Wagner (C&W) attack.

Various cognitive systems may utilize trained models, such as trained neural networks, to perform their cognitive operations. For example, a neural network implemented model may be used to provide image analysis, facial recognition, fingerprint or retinal image recognition, speech pattern analysis, or the like, for a cognitive security system, such as an image recognition surveillance system, a biometric authentication system, etc. Often times, such neural networks, and other types of machine learning or cognitive models, are utilized in or with cognitive systems to perform a classification operation, upon which the cognitive system operates to perform a cognitive operation, e.g., classifying an input into one of a plurality of predetermined classifications (classes) which is then used to perform a more complex analysis or reasoning operation using cognitive system mechanisms.

Attackers may attempt to thwart such systems by performing evasion attacks, such as gradient-based attacks. An evasion attack on a cognitive system, e.g., on the neural network or other cognitive or machine learning model implemented by the cognitive system, involves the attacker attempting to fool the model to misclassify a manipulated input. For example, an attacker may make almost imperceptible manipulations on input data to generate adversarial input, where an adversarial input is an input formed by applying small, but intentional, perturbations to data samples from a data set (where the term "data set" as used herein refers to a set of one or more data samples), such that the perturbed input results in the computing model, e.g., deep learning neural network (DNNs), convolutional neural networks (CNNs), or other machine learning computing model, outputting an incorrect answer with high confidence. The adversarial input will cause the computing model (hereafter assumed to be a convolutional neural network (CNN), as an example) to misclassify the input and thus, malfunction, resulting in a breach of security. The misclassification that the adversarial input intends to cause is often referred to as the "target" label (t) generated by the computing model based on the input data, whereas the correct or "true" label ($t_0$) is the label that the computing model should output for the original (non-perturbed) input data. Such misclassification may prevent the computing model, and thus the system, from correctly classifying valid inputs as valid, or allow invalid inputs to be incorrectly classified as valid. For example, an attacker attempting to fool a facial recognition neural network may purposefully add small imperfections to their appearance, and thereby generate an adversarial input, in an attempt to fool the facial recognition into misclassifying the attacker as an authorized individual.

Such evasion attacks, e.g., Fast Gradient Step Method (FGSM) or Iterative Fast Gradient Step Method (IFGSM) and the like, tend to be classifiable as white box attacks and are dependent upon the attacker identifying a correct gradient of the loss surface of the neural network or other cognitive or machine learning model. The loss surface, also referred to as the loss function or cost function, in the context of machine learning, neural networks, and cognitive system operations, is a function that represents the price paid for inaccuracy of predictions, e.g., the cost of inaccuracy in a classification prediction. A white box attack involves the attacker having full access to the cognitive system and the attacker may in fact be a user of the cognitive system, as opposed to black box attacks where the attacker does not have access to the endpoints of a secure transaction, or a gray box attack in which the attacker is able to interact with one or more of the endpoints via observation and/or alteration of system parts and processes. Such white box attacks are mostly based on gradients, as described in Goodfellow et al., "Explaining and Harnessing Adversarial Examples," ICLR 2015, Mar. 20, 2015. For example, the JSMA attack is a type of white box attack that greedily modifies one pixel at a time until the image is classified incorrectly. The FGSM attack takes a single step, for all pixels, in the direction of the gradient. The Carlini and Wagner (C&W) attack uses gradient descent to optimize a custom loss function. Other types of attacks include the elastic-net attack on DNNs (EAD), structured (Str) attacks, and the like.

In order to harden computer models, such as those implemented in cognitive systems, neural networks, or other machine learning models, against such attacks, adversarial inputs may be generated during training of these systems, networks or models, to train these systems, networks, or models to be less sensitive to the adversarial perturbations implemented by these attacks. However, there currently is no mechanism to quantify the effects of these adversarial effects on the operation of such systems, networks, or models such that selection of which types of perturbations to use to provide such adversarial inputs to train the systems, networks, or models is made more effective. Moreover, there is no mechanism currently available to identify which portions of input data, when perturbed by an adversarial perturbation, are more influential on the operation of the systems, networks, or models than other portions of the input data, e.g., regions of an input image.

The illustrative embodiments are directed to an improved computer tool that is configured to evaluate and quantify the effectiveness of various adversarial attacks at different granularities of evaluation, e.g., grid-level (where a grid is a group of one or more pixels) and image-level adversarial pattern effectiveness in image analysis embodiments. A new unified metric for specifying the effectiveness of adversarial attacks is defined and used to quantify the effectiveness of the adversarial attacks. Based on the quantification provided by the defined metric of the illustrative embodiments, it has been determined that adversarial perturbations of input data, e.g., image input data for image classification operations, may be classified into three different types of adversarial perturbations: (1) suppression-dominated perturbations that reduce the classification score of the true label ($t_0$) of the image; (2) promotion-dominated perturbations that focus on boosting the score of the target label (t) of the adversarial perturbation based attack; and (3) balanced perturbations that play a dual role on suppression and promotion.

The illustrative embodiments further provide mechanisms for generating a visualization of the quantified effectiveness of adversarial perturbation based attacks at the various granularities so as to provide a user understandable representation as part of robustness evaluation tools for evaluating cognitive computing systems, neural networks, or other machine learning computer models with regard to their vulnerabilities to various types of attacks and particular perturbations used in such attacks. In some illustrative embodiments, the visualization may make use of classification activation maps (CAMs) that are modified in accordance with the illustrative embodiments, via the application of an interpretability score (IS) mask, to visually represent the effects of adversarial perturbations on the predicted classification score outputs of the cognitive computing system, neural network, or other machine learning computer model, given any pair of an input image and object label, i.e. any label purposefully selected for pairing with the input image, whether that label is a true label or a non-true label. The use of CAMS to identify discriminative image regions used by a computer model to identify the category of the input image has been described in Zhou et al. "Learning Deep Features for Discriminative Localization," Proceedings of the IEEE Conference on Computer Vision and Pattern Recognition, pp. 2921-2929, 2016. Discriminative image regions are the regions of an input image that are most influential in the final determination of the output generated by the computer model, e.g., the DNN, CNN, or the like.

The modified CAM mechanisms of the illustrative embodiments, in an illustrative embodiment directed to image classification, highlights the discriminative regions detected by the cognitive computing system, neural network, or other machine learning computer model (hereafter assumed to be a neural network for purposes of illustration) in response to adversarial perturbed images, with visual representations indicating suppression and promotion dominated perturbations matched to the discriminative regions of the input image. In such a visualization, it is determined that adversarial perturbations highly correspond to the discriminative object regions associated with either the true label, the target label, or both, regardless of the attack mechanism. The modified CAM mechanisms of the illustrative embodiments further enable direct visual comparison of different approaches of adversarial perturbation generation, providing intuitive insights into the efficacy of these approaches.

Moreover, in some illustrative embodiments, modifications to the training of cognitive computing systems, neural networks, or other machine learning computer models, such as by way of automatically modifying the training data sets to include adversarial training data based on the quantified effectiveness of the various adversarial attacks, is performed with subsequent training of the cognitive computing system, neural network, or other machine learning computer model based on the modified training data set including the adversarial training data. That is, in some illustrative embodiments, based on the identification of regions of images where particular types of attacks, e.g., adversarial perturbations, are most effective both with regard to suppression-dominated perturbations and promotion-dominated perturbations, the mechanisms of the illustrative embodiments can determine what regions of images to perturb to generate adversarial images for training data sets such that the cognitive computing system, neural network, or other machine learning computer model is trained to be less sensitive to such adversarial image inputs. Hence, given a training data set comprising a plurality of training images, the training images may be automatically perturbed in accordance with the identified regions of the images, to generate adversarial training images which are then added to the training data set or stored as a separate adversarial training image data set that may be used to train the cognitive computing system, neural network, or other machine learning computer model to properly classify the images even in the presence of such perturbations, through a machine learning process. In this way, the cognitive computing system, neural network, or other machine learning computer model may be hardened against such attacks where this hardening targets the specific regions of images where perturbations are most effective as determined through the mechanisms of the illustrative embodiments.

Before discussing the details of illustrative embodiments further, it is important to first have an understanding of the way in which adversarial perturbations are designed. With this in mind, assume $x_0$ denotes an original, unperturbed image, also referred to as the "natural" image. An adversarial image is then given by the relationship $x'=x_0+\delta$, where $\delta$ is a perturbation of one or more pixels of the natural image. By setting the input to the cognitive computing system, neural network (such as a deep learning neural network (DNN), convolutional neural network (CNN), or the like), or other machine learning model (hereafter assumed to be a CNN for illustration purposes) to x0 and x', the CNN, which operates as a classifier to classify the image and/or objects within the image into one of a plurality of predetermined classifications, will predict the true label (or classification) t0 and the target label t ($\neq$t0), respectively. To successfully generate adversarial examples, i.e. to find adversarial perturbations $\delta$, a "norm-ball" constrained attack technique is used, with examples again being the IFGSM, C&W, EAD, and structured attacks.

The iterative FGSM attack crafts adversarial examples by performing iterative fast gradient sign method (IFGSM) followed by $\epsilon$-ball clipping. Iterative FGSM attacks are designed to be fast rather than optimal.

The C&W, EAD, and structured attacks can be unified in the following optimization framework—minimize $\delta$ subject to:

$$f(x_0+\delta,t)+\lambda g(\delta); \text{ and}$$

$$(x_0+\delta)\in[0,1]^n, h(\delta)\leq 0, \quad (1)$$

where $f(x_0+\delta, t)$ denotes a loss function for targeted misclassification, $g(\delta)$ is the regularized function that penalizes the norm of adversarial perturbations, $\lambda>0$ is a regularization parameter, and $h(\delta)$ places optionally hard constraints on $\delta$. All C&W, EAD, and structured attacks have a similar loss function:

$$f(x_0+\delta, t) = c*\max\left\{\max_{j\neq t} Z(x_0+\delta)_j - Z(x_0+\delta)_t, -\kappa\right\},$$

where Z(x)j is the j-th element of logits Z(x), namely, the output before the last softmax layer in the CNN, and κ is a confidence parameter. Clearly, as κ increases, the minimization off would reach the target label with high confidence. For purposes of illustration, in the illustrative embodiments described herein the value of κ is set to 1 by default.

The C&W attack adopts the $\ell_p$ norm to penalize the strength of adversarial perturbations δ, namely, $g(\delta)=\|\delta\|_p$ and $h(\delta)=0$ in equation (1) above, where $p\in\{0, 2, \infty\}$. In practice, the squared $\ell_2$ norm is used.

The EAD attack specifies the regularized term λg(δ) as an elastic-net regularizer $\lambda_1\|\delta\|_2^2+\lambda_2\|\delta\|_1$ in equation (1) above. The EAD attack has empirically shown that the use of the elastic-net regularizer improves the transferability of adversarial inputs.

The structured (Str) attack takes into account the group-level sparsity of adversarial perturbations by choosing g(δ) as the group Lasso penalty. In the mean time, the Str attack constrains the pixel-level perturbation by setting $h(\delta)=\|\delta\|_\infty-\in$ for a tolerance $\in>0$.

The mechanisms of the illustrative embodiments, in one aspect, are directed to an improved computing tool that quantifies the effects of adversarial perturbations, such as those noted above, on the operation of machine learning computer models, such as those used in cognitive computing systems, deep learning neural networks (DNNs) or convolutional neural networks (CNNs), and other types of machine learning computer models. As can be appreciated, such computer models may be applied to a variety of different classification tasks, however for purposes of the present description, it will be assumed that the computer models in the example illustrative embodiments are CNNs performing image classification operations. The problem of quantifying the effects of adversarial perturbations is directly related to how much impact a perturbation produces on the classification results of both the correct (true) and target labels.

The mechanisms of the illustrative embodiments utilize the change in logit scores in the CNN based classification model to measure the effect of a perturbation on an output classification label. Such evaluations of the changes in logit scores may be performed at various different levels of granularity including the pixel-level perturbations and grid-level perturbations, where a grid-level perturbation is one that affects a group of pixels corresponding to a local region of an image. The grid-level sensitivity measure based on the change of logit scores may be extended to perform image-level sensitivity analysis as well.

To illustrate a grid-level sensitivity measure utilized by the mechanisms of one or more of the illustrative embodiments, consider that $x\in\mathbb{R}^n$ denotes an image, where unless specified otherwise, the vector representation of the image is used. Recall that $x=x_0$ gives the original, unperturbed, or "natural" image, and $x=x'$ corresponds to the adversarial image. The image x is divided into m grid points with coordinates $\{\mathcal{G}_i\}_{i=1}^m$, where each $\mathcal{G}_i$ contains a group of pixels corresponding to a local region of the image, and $\cup_{i=1}^m \mathcal{G}_i=[n]$, where [n] denotes the overall set of pixels {1, 2, . . . , n}. For ease of discussion, the groups of pixels $\{\mathcal{G}_i\}_{i=1}^m$ are referred to herein as "grids," which can be obtained by applying a sliding mask with a given stride to the image x, such as described in Xu et al., "Structured Adversarial Attack: Towards General Implementation and Better Interpretability," 2018, Sec. 2, arXiv preprint arXiv: 1808.01664, for example.

To characterize the perturbation at grid $\mathcal{G}_i$, the perturbation $\delta_{\mathcal{G}_i}\in\mathbb{R}^n$ is introduced, where $[\delta_{\mathcal{G}_i}]_j=\delta_j$ if $j\in\mathcal{G}_i$, and 0 otherwise. Here $[a]_i$ or $a_i$ denotes the $i^{th}$ element of an arbitrary vector a. A sensitivity measure of grid-level adversarial perturbations measures the effect of $\delta_{\mathcal{G}_i}$ through its induced logit change with respect to the true label $t_0$ and the target label t, respectively. The impact of the grid-level perturbation $\delta_{\mathcal{G}_i}$ (for $i\in[m]$) on image classification is measured from two aspects: a) the logit change $d_{0,i}$ with respect to the true label $t_0$, and b) the logit change $d_{t,i}$ with respect to the target label t. That is, $$d_{0,i}=\max\{Z(x'-\delta_{\mathcal{G}_i})_{t_0}-Z(x')_{t_0},\xi\} \quad (2)$$

$$d_{t,i}=\max\{Z(x')_t-Z(x'-\delta_{\mathcal{G}_i})_t,\xi\} \quad (3)$$

$$s_i:d_{0,i}+d_{t,i} \quad (4)$$

where $Z(x)_j$ gives the logit score with respect to class j, and $\xi>0$ is a small positive number.

In the above relationships, $d_{0,i}$ measures how much the logit score (with respect to $t_0$) will change if the perturbation at $\mathcal{G}_i$ is eliminated. Clearly, a large $d_{0,i}$ implies a more significant role of $\delta_{\mathcal{G}_i}$ on suppressing the classification result away from $t_0$. By contrast, $d_{t,i}$ measures the effect of $\delta_{\mathcal{G}_i}$ on promoting the targeted classification result. The overall adversarial significance $s_i$ of $\delta_{\mathcal{G}_i}$ is the combined effect of $d_{0,i}$ and $d_{t,i}$ through their $\ell_1$ norm. In some illustrative embodiments, the $\ell_1$ norm $\|[d_{0,i}, d_{t,i}]\|_2$ can also be used to define $s_i$. Thus, grids with small $\ell_1$ norm values play a less significant role in misleading image classifiers. In equations (2) and (3) above, the value of $\xi$ is set to remove the negative values of $d_{0,i}$ and $d_{t,i}$, namely, the insignificant case.

As an application of $\{d_{0,i}\}$ and $\{d_{t,i}\}$, a promotion-suppression ratio (PSR) is defined as $r_i$ as follows:

$$r_i=\log_2(d_{t,i}/d_{0,i}); i\in[m] \quad (5)$$

which describes the effects of $\delta_{\mathcal{G}_i}$ on misclassification. In equation (5), the logarithm is taken for ease of studying PSR ($r_i$) under different regimes, e.g., $r_i\geq 1$ implies that $d_{t,i}\geq 2d_{0,i}$. The effect of $\delta_{\mathcal{G}_i}$ is then categorized into three categories: suppression-dominated perturbation, promotion-dominated perturbation, and balanced perturbation.

Given a confidence score $\eta>0$, if $r_i<-\eta$, then $\delta_{\mathcal{G}_i}$ is a (grid-level) suppression-dominated perturbation, which is mainly used to reduce the classification logit of the true label. If $r_i>\eta$, then $\delta_{\mathcal{G}_i}$ is a (grid-level) promotion dominated perturbation, which is mainly used to boost the classification logit of the target label. If $r_i\in[-\eta, \eta]$, then $\delta_{\mathcal{G}_i}$ is a (grid-level) balanced perturbation that plays a dual role on suppression and promotion. It should be noted that different threshold values of η can be used, with η=1 being selected for ease of analysis and visualization.

The adversarial significance $s_i$ and PSR $r_i$ on a grid can be extended to those on the image as a whole if $\delta_{\mathcal{G}_i}$ is set to be δ in equations (2) and (3) above. This extension offers an effective way to evaluate the overall suppression/promotion effect of adversarial perturbations. Similarly, an adversarial input can be categorized into one of the three types of effects, namely, suppression-dominated, promotion-dominated and balanced adversary, for the image-level evaluation.

Figure 1B:
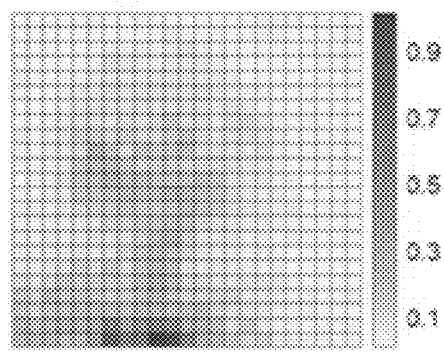
Figure 1C:
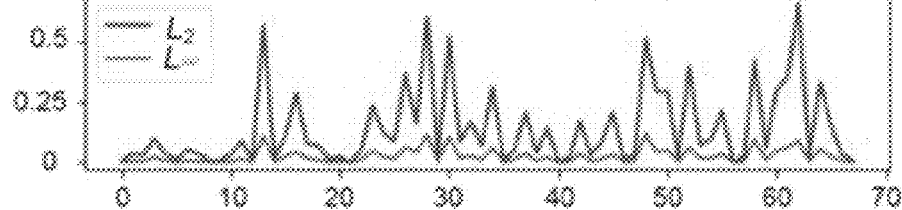
Figure 1D:
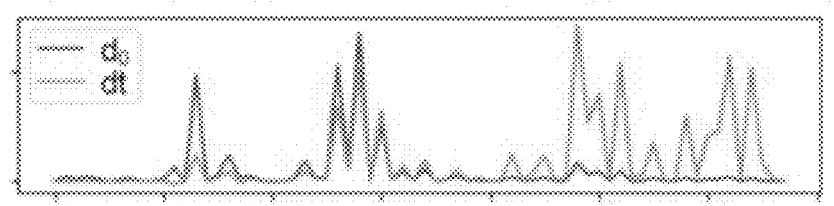
Figure 1E:
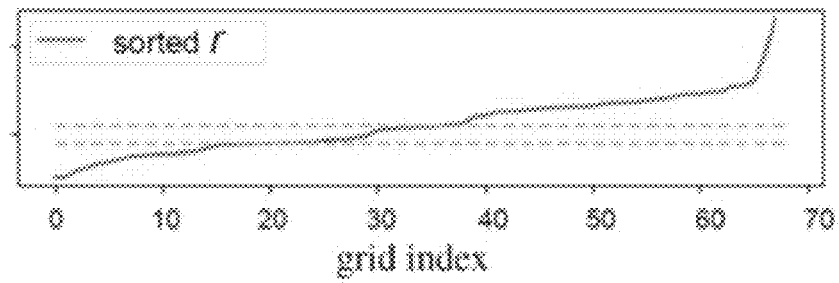

FIGS. 1A-1E illustrate an adversarial input together with its adversarial perturbations generated by a C&W attack. FIG. 1A shows the input image. FIG. 1B shows a heat map plot corresponding to the input image, which represents the $\ell_2$nor m of grid-level perturbations $\|\delta_{\mathcal{G}_i}\|_2$ for $i \in [m]$. FIG. 1C shows a sub-plot of $\|\delta_{\mathcal{G}_i}\|_2$ and $\|\delta_{\mathcal{G}_i}\|_\infty$ versus i for the input of FIG. 1A. FIG. 1D is a sub-plot showing the sensitivity measures $d_{0,i}$ and $d_{t,i}$ versus i for the input of FIG. 1A. FIG. 1E is a sub-plot showing PSR $r_i$ versus i for the input of FIG. 1A. In FIG. 1E, the dashed lines correspond to r=1 and −1, and all grid indices are aligned with indices of sorted PSRs.

In the depicted example of FIGS. 1A-1E, $t_0$ and t correspond to "badger" and "computer", respectively. FIGS. 1A-1E demonstrate more insights on the sensitivity measures set forth in equations (2)-(5) above in the graphical depictions. As can be seen in FIGS. 1A-1D, either $\{d_{0,i}\}$ or $\{d_{t,i}\}$ has a strong correlation with the strength of adversarial perturbations at each grid (in terms of the $\ell_2$ and $\ell_\infty$ norms of $\delta_{\mathcal{G}_i}$). Furthermore, PSR $r_i$ identifies the types of adversarial perturbations considered. In this example, most of the perturbations $\{\delta_{\mathcal{G}_i}\}$ contribute to promoting the output classification to be the target class t ($d_{t,i} > 2d_{0,i}$).

Table 1 below shows an example correlation between the sensitivity scores ($\{d0,i\}$ or $\{dt,i\}$) and the strength of adversarial perturbations for a quantitative analysis comprising 500 adversarial inputs under 4 types of attacks, iterative FGSM (IFGSM), C&W, EAD, and Str, using the Resnet and Inception computer models in this example case.

It is observed from these results that, except for the IFGSM attack, other studied attacks maintain a good correlation between perturbation strength and adversarial sensitivity. This explains that IFGSM is far from an optimal attack with minimal distortion that is sufficient to fool CNNs. It is also observed that the Str attacks have the highest correlation, which verifies its efficiency shown by Xu et al., "Structured Adversarial Attack: Towards General Implementation and Better Interpretability," 2018.

TABLE 1

Correlation between sensitivity measures $d_{0,i}$, $d_{t,i}$, and $s_i$ and $\ell_2$ norm of $\delta_{\mathcal{G}_i}$ for all grids $i \in [m]$, where the column name $d_{0,i}$ means corr($\{d_{0,i}, \|\delta_{\mathcal{G}_i}\|_2\}$) and the same notation rule holds for the last two columns.

| Attack | Model | $d_{0,i}$* | $d_{t,i}$ | $s_i$ | ‖ [$d_{t,i}$, $d_{t,i}$] ‖$_2$ |
|---|---|---|---|---|---|
| IFGSM | Resnet | 0.303 | 0.480 | 0.522 | 0.510 |
| | Inception | 0.170 | 0.220 | 0.248 | 0.237 |
| C&W | Resnet | 0.507 | 0.538 | 0.609 | 0.552 |
| | Inception | 0.545 | 0.517 | 0.620 | 0.581 |
| EAD | Resnet | 0.602 | 0.630 | 0.710 | 0.714 |
| | Inception | 0.639 | 0.655 | 0.697 | 0.685 |
| Str | Resnet | 0.625 | 0.720 | 0.783 | 0.692 |
| | Inception | 0.643 | 0.614 | 0.702 | 0.660 |

Table 2 summarize the percentages of different types of adversarial images determined by the image-level PSR. As can be seen from Table 2, no single attack mechanism is dominant except for IFGSM on Resnet, suggesting that all the strategies considered here are effective for fooling CNN based image classifiers. As an exception, IFGSM primarily concentrates on promoting the score of the target label. It will be shown below that the IFGSM attack is structure-blind, with each perturbation producing a small but similar adversarial effect. It is also shown that EAD and Str attacks present similar results since both attack methods penalize a combination of $\ell_1$ and $\ell_2$ distortion metrics. As will be made more clear, the adversarial perturbations of these two approaches highly correspond to the discriminative regions related to either the true label, the target label, or both. Such structure-oriented behaviors will lead to stronger adversarial effects.

As noted above, the illustrative embodiments further provide a modified classification activation map (CAM) visualization mechanism for visually representing the portions of data, e.g., regions of images, where adversarial perturbations are most effective in affecting the output of the computer model, e.g., the image classification or class label. As described in Zhou et al., "Learning Deep Features for Discriminative Localization," Proceedings of the IEEE conference on Computer Vision and Pattern Recognition, pp. 2921-2929, 2016, a CAM builds a localized deep representation that exposes the implicit attention of the computer model, e.g., CNN, on a labelled image. That is, let F(x,c) denote a class activation map (CAM) for image x with class label c. The strength of a spatial element in F(x,c) characterizes the importance of the activation at this spatial grid leading to the classification of the image to the class label c.

TABLE 2

Percentage of promotion-dominated, suppression-dominate, and balanced adversarial inputs over 500 images.

| Attack | Model | Suppression | Promotion | Balance |
|---|---|---|---|---|
| IFGSM | Resnet | 1.80% | 95.5% | 2.70% |
| | Inception | 16.2% | 49.4% | 34.4% |
| C&W | Resnet | 48.3% | 35.0% | 16.7% |
| | Inception | 38.8% | 15.0% | 46.2% |
| EAD | Resnet | 23.0% | 61.8% | 15.2% |
| | Inception | 19.2% | 18.3% | 62.5% |
| Str | Resnet | 20.3% | 61.1% | 18.6% |
| | Inception | 16.7% | 13.5% | 69.8% |

Figure 2:
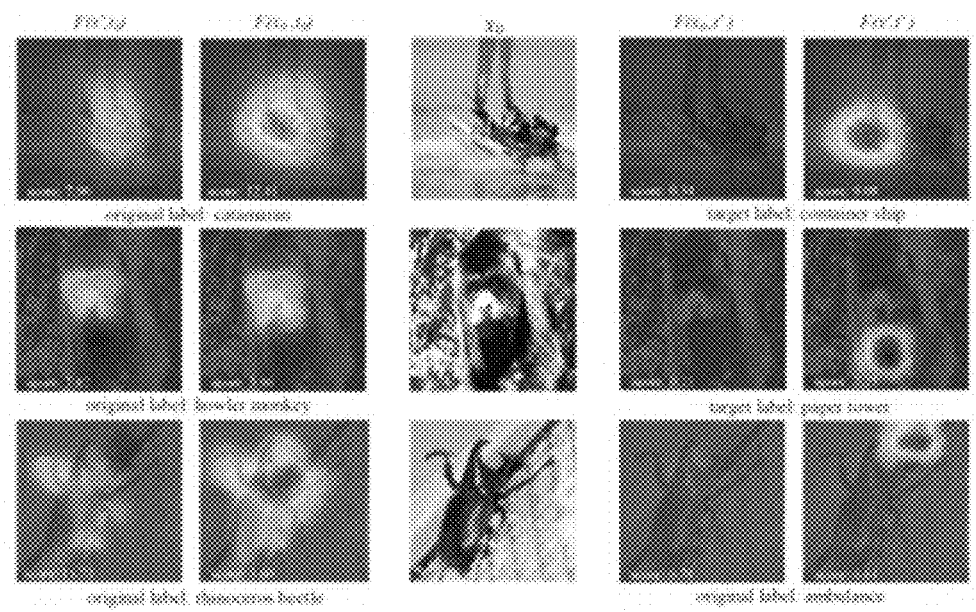
FIG. 2 is an example diagram showing classification activation maps (CAMs) of three natural/adversarial examples generated by a C&W attack.

FIG. 2 is an example diagram showing CAMs of three natural/adversarial examples (in rows), generated by a C&W attack, where F(x', $t_0$), F($x_0$, $t_0$), $x_0$, F($x_0$, t), and F(x', t) are shown from the left to the right in each row. The heat map color from blue to red represents the least and the most discriminative region localized by CAM, respectively. Here the values of CAMs at each row are normalized to the same baseline (their maximum value) so that they are comparable. From FIG. 2 it can be seen that, given an adversarial image, the CAM yields distinct discriminative regions for different input images and class labels. Comparing F($x_0$, $t_0$) with F(x', $t_0$), it is observed that the most discriminative region for ($x_0$, $t_0$) is suppressed as the adversarial perturbations δ are added to $x_0$. By contrast, viewing F($x_0$, t) and F(x', t), the discriminative region of $x_0$ with the target label t is enhanced by performing the targeted adversarial attack in terms of δ.

FIG. 2 indicates that the effect of adversarial perturbations can be visually explained through class-specific discriminative image regions localized by CAMs. The two most informative CAMs are F($x_0$, $t_0$) and F(x',t) since the other two CAMs F($x_0$, t) and F(x', $t_0$) are given by small CAM scores, namely ($x_0$, t) and (x', t=$t_0$) give non-dominant discriminative image regions compared to ($x_0$, $t_0$) and (x', t). F(x0, t0) characterizes the discriminative regions that adversarial perturbations would suppress, while F(x', t) reveals the image regions in which the adversarial perturbations enhance the likelihood of the target class. This suppression/promotion analysis is consistent with the sensitivity of (grid-level) perturbations characterized by PSR. However, CAM offers a visual explanation at the image level of this suppression/promotion sensitivity.

With the aid of CAMs and the PSR evaluation, the mechanisms of the illustrative embodiments provide an interpretability score (IS) to quantify the interpretability of adversarial perturbations using CAM at an image level. That is, where the PSR provides a measure of sensitivity at a pixel or grid-level, the IS provides an additional measure of sensitivity at the image level. The "interpretability score" is a measure illustrating how to interpret the relationship between the adversarial attack and the attacked raw images. The sensitivity overlay mask generated by mechanisms of the illustrative embodiments is characterized by the PSR evaluation, which indicates how the adversarial attack performs on an image. In the example illustrative embodiments, black means the attack attempts to attack the image region that is most likely to be recognized as the wrong (or target) label, white means the attack attempts to attack the image region that is the most similar to the true label, and gray means the attack attempts to attack regions that are most similar to both the target and true labels. The interpretability score gives an indication of the role of the attack from the aforementioned analysis. By providing a tool to visualize the effects of adversarial attacks, the visualization helps to increase the robustness of the computer model and corresponding computer system either by manually or automatically hardening the computer model and system to defend against these attacks' behaviors.

The interpretability score (IS) of the illustrative embodiments may be defined in the following manner. Given a vector representation of a CAM F(x, c), let B(x, c) denote the Boolean map that encodes the most discriminative region localized by the CAM, $$[B(x, c)]_i = \begin{cases} 1 & [F(x, c)]_i \geq v \\ 0 & \text{otherwise} \end{cases} \quad (6)$$

where v>0 is a given threshold to highlight the most class-specific discriminative region, and $[F(x, c)]_i$ is the $i^{th}$ element of F(x, c). The value of v may be set to any desired threshold depending on the particular implementation, but in some illustrative embodiments is set to 0.5 as a practical value. The IS of adversarial perturbations δ with respect to (x, c) is defined by:

$$IS(\delta) = \|B(x,c) \circ \delta\|_2 / \|\delta\|_2 \quad (7)$$

where ∘ is an element-wise product.

In equation (7) above, IS(δ)→1 if the discriminative region perfectly predicts the locations of adversarial perturbations, i.e. if the adversarial perturbation is in the discriminative region. By contrast, if IS(δ)→0, then adversarial perturbations cannot be interpreted by the CAM, i.e. the adversarial perturbation is not in the discriminative region. Again, it should be appreciated that the CAM indicates where the image looks the most similar to a class label, e.g., dog image to cat label. Therefore, if the label is a wrong label, e.g., the cat label, the IS implies that attacking the part of the image with high IS values could be more harmful, and interprets where an attack should attack a digital image.

In Table 3 below, IS is represented for 4 types of adversarial attacks on two neural network models. As can be seen from Table 3, the structured attack yields the best interpretability in terms of CAMs F(x0, t0) and F(x0+δ, t). By contrast, IFGSM provides the worst interpretability of the neural network models considered in Table 3. This is consistent with the fact that the structured attack is able to extract important local structures of images by penalizing the group sparsity of adversarial perturbations.

TABLE 3

IS for 4 attacks on two neural network models, averaged over 500 natural/adversarial images on ImageNet.

| Attack | Model | IS($x_0$, $t_0$) | IS(x', t) |
|---|---|---|---|
| IFGSM | Resnet | 0.594 | 0.604 |
|  | Incep. | 0.634 | 0.655 |
| C&W | Resnet | 0.610 | 0.823 |
|  | Incep. | 0.654 | 0.784 |
| EAD | Resnet | 0.625 | 0.880 |
|  | Incep. | 0.630 | 0.865 |
| Str | Resnet | 0.626 | 0.941 |
|  | Incep. | 0.767 | 0.983 |

IS evaluates the interpretability of adversarial images, e.g., where, how and to what extent an attack should attack an image to be most effective in terms of less perturbation power for an image, of adversarial images at a macro-level through CAM. To provide a finer analysis, the PSR in equation (5) above is combined with CAM to visually explain the effect of grid-level perturbations $\{\delta_{g_i}\}$. Recall that PSR categorizes $\{\delta_{g_i}\}$ into three types of perturbations: suppression dominated perturbations for $r_i$<−1, promotion dominated perturbations for $r_i$>1, and balanced perturbations for ri∈[−1, 1] (where again, $r_i$ is the promotion-suppression ratio (PSR)).

Figure 3:
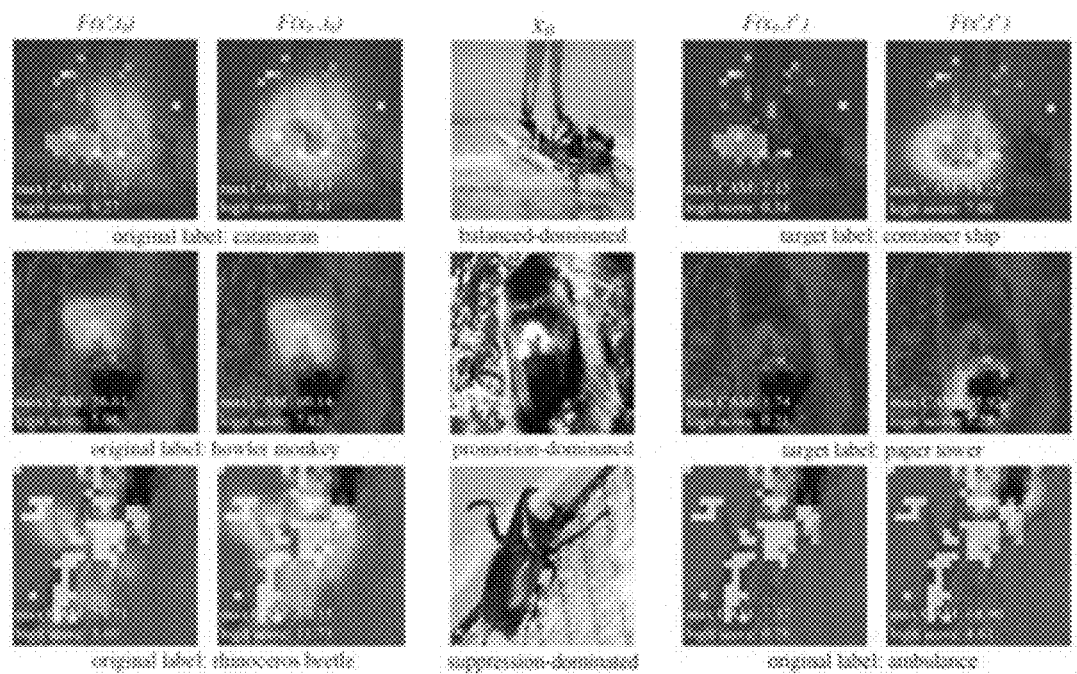
FIG. 3 illustrates the examples from FIG. 2 in which the images are overlaid with a mask $\{r_i\}$ at the locations of grid-level adversarial perturbations in accordance with one illustrative embodiment.

FIG. 3 illustrates the examples from FIG. 2 in which the images are overlaid with a PSR mask $\{r_i\}$ at the locations of grid-level adversarial perturbations in accordance with one illustrative embodiment. The IS discussed above gives per-image interpretability level while the PSR gives grid-level interpretability. Thus, collecting all grid-level PSR results will also imply IS results. These are consistent at the image level, as shown in FIG. 3. That is, as can be seen from FIG. 3, the examples shown in FIG. 3 demonstrate the balanced, promoted, and suppressed role of $\delta_{g_i}$, respectively, and the positions of grid-level perturbations are well matched to the discriminative region F($x_0$, $t_0$) and/or F(x', t). FIG. 3 further shows that both grid-level and image-level interpretability of adversarial examples are consistent.

Figure 4A:
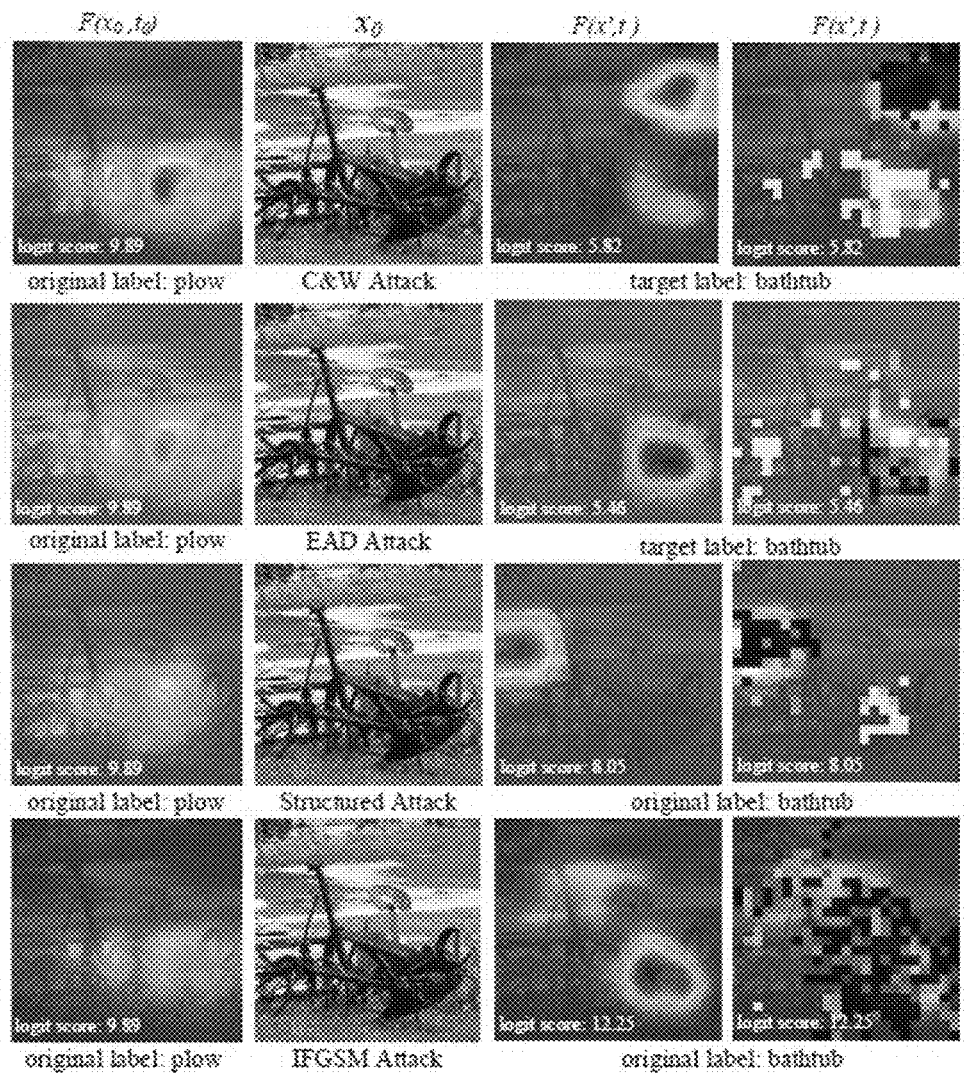
FIG. 4A illustrates example images in which the original or natural image corresponds to the true label "plow" and compared with different attacks with a target label of "bathtub.

FIG. 4A illustrates example images in which the original or natural image corresponds to the true label "plow" and compared with different attacks with a target label (i.e. the label the attack seeks to cause the neural network to output, i.e. the misclassification) of "bathtub." As can be seen from FIG. 4A, differences and similarities exist among the considered adversarial attacks. In particular, comparing F(x', t) to F($x_0$, t=$_0$), the discriminative regions on which C&W and Str-attack boost the belief of the target label 5 are significantly different. By contrast, EAD and IFGSM enjoy some similarities on F(x', t). All of the attacks suppress the likelihood of the true class corresponding to the most discriminative regions in F($x_0$, $t_0$). Thus, FIG. 4 illustrates that the mechanism of the adversarial attacks can be well interpreted from the CAM mechanisms of the illustrative embodiments.

From the above, it can be appreciated that the CAM mechanisms of the illustrative embodiments can be used to localize class-specific discriminative image regions and reveal the patterns of significance of adversarial perturbations. By removing less significant grid-level perturbations, the effectiveness of adversarial attacks can be improved, where the effectiveness is measured through its attack success rate (ASR) and its $\ell_p$ norm for $p \in \{0, 1, 2, \infty\}$. Moreover, the dominated pattern may constrain the effectiveness of an adversarial attack, as discussed hereafter.

To illustrate the effectiveness of adversarial perturbation patterns, consider two types of adversarial perturbation patterns. The first type of adversarial perturbation pattern is given by the most significant grid-level perturbations after removing grids with $s_i \le \beta$, where $s_i$ gives the significance power of $\delta_{g_i}$ and $\beta$ is the given threshold. In practice, in one illustrative embodiment, $\{s_i\}$ is sorted to $\{\tilde{s}\}$ in ascending order, and $\beta = \tilde{s}_k$ for the smallest k with $$\frac{\sum_{i=1}^{k} s_i}{\sum_{i=1}^{m} \tilde{s}_i} \ge 30\%.$$

Less significant perturbations are filtered based on their cumulative power.

The second type of adversarial perturbation pattern is given by the most discriminative region of the natural image $x_0$ and its label $t_0$, localized by CAM $F(x_0, t_0)$ or $B(x_0, t_0)$ in equation (6) above. For ease of presentation, let S denoted the set of pixels involved in the aforementioned perturbation patterns. Thus, it is beneficial to determine whether a more effective adversarial example may be found by perturbing a smaller number of pixels provided by S. To refine the adversarial perturbation under the prior knowledge 5, the problem described previously with equation (1) above may be reformulated as minimize $\delta$ subject to:

$$f(x_0+\delta,t)+\lambda g(\delta); \text{ and}$$

$$(x_0+\delta) \in [0,1]^n, h(\delta) \le 0,$$

$$\delta_i = 0, \text{if } i \notin S \quad (8)$$

where $S = \{\forall i | s_i > \beta\}$ or $S = \{\forall i | [B(x_0, t_0)]_i > 0\}$. The reformulated problem in relationship (8) can be similarly solved as the problem defined in relationship (1) above to optimize variables $\{\delta_i\}$ indexed only by S. The solution to the problem in relationship (8), denoted by $\delta_S$, yields the desired adversarial attack.

Figures 4B, 5:
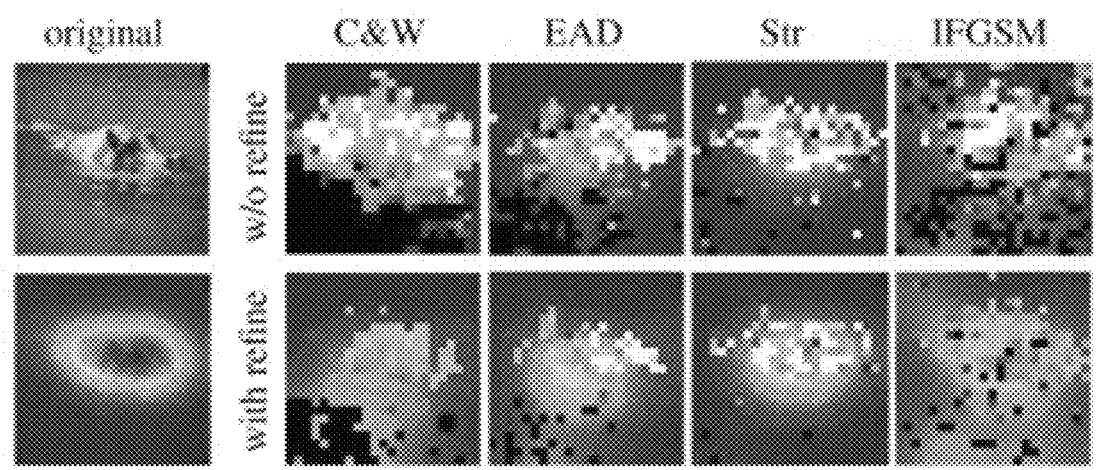
FIG. 4B summarizes the attack success rate (ASR) and the $\ell_p$-norm distortion of $\delta_S$ for 4 different attack methods under 2 neural network models.
FIG. 5 shows a comparison of original versus refined "hippocampus" to "streetcar" adversarial examples (top versus bottom sub-plots) under a first adversarial pattern for 4 attack methods.

Considering the first type of adversarial pattern $S = \{\forall i | s_i > \beta\}$, the table in FIG. 4B summarizes the attack success rate (ASR) and the $\ell_p$-norm distortion of $\delta_S$ for 4 different attack methods under 2 neural network models. It can be seen from FIG. 4 that for IFGSM, $\ell_0$, $\ell_1$, $\ell_2$ norms of refined adversarial perturbations $\delta_S$ are reduced, together with higher $\ell_\infty$ norm and slightly lower ASR. For C&W, $\ell_0$ and $\ell_1$ norms of $\delta_S$ are significantly reduced compared to a slight increase in $\ell_2$ and $\ell_\infty$ norms. For EAD, $\ell_0$, $\ell_2$, $\ell_\infty$, norms of $\delta_S$ are improved, while the $\ell_1$ norm increases. For Str-attack, $\delta_S$ becomes more effective than $\delta$ at every norm-based distortion metric. The results of FIG. 4 confirms the importance of the found adversarial pattern Sin that it is possible to obtain a more effective attack using less perturbed pixels.

FIG. 5 shows a comparison of original versus refined "hippocampus" to "streetcar" adversarial examples (top versus bottom sub-plots) under the adversarial pattern $S = \{\forall i | s_i > \beta\}$ PI for 4 attack methods. In FIG. 5, the PSRs of grid-level perturbations are overlaid on the CAM as the black, white, and gray regions, where these colors represent the suppression-dominant (white), promotion-dominant (black), and balanced (gray) permutations. From the overlay of the PSR mask on the CAM, one can identify the perturbations that are most effective for suppressing correct or true label $t_0$ output of the corresponding neural network model and/or promoting the target label t (misclassification label that is sought by the attack) output of the neural network model. This can be done for specific attacks, or across multiple attack methodologies.

Figure 6:
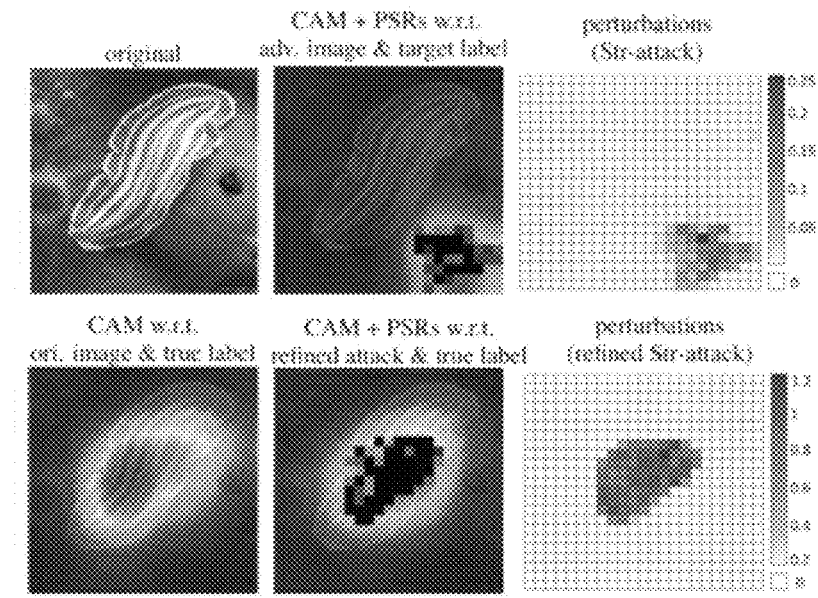
FIG. 6 illustrates a "flatworm" to "knot" adversarial attack example generated by a Str-attack methodology.

With the second type of adversarial pattern $S = \{\forall i | [B(x_0, t_0)]_i > 0\}$, refining the adversarial perturbations under only a suppress-dominated pattern is not optimal. FIG. 6 illustrates a "flatworm" to "knot" adversarial attack example generated by a Str-attack methodology. FIG. 6 shows the original versus refined adversarial examples (top versus bottom sub-plots) under the adversarial pattern $S = \{\forall i | [B(x_0, t_0)]_i > 0\}$, generated by the Str-attack methodology. Sub-plots at the third column present the $\ell_2$ norm of grid-level perturbations with the maximum value 0.25 in the top sub-plot and 1.2 in the bottom sub-plot.

As can be seen in FIG. 6, $\delta$ originally performs to boost the likelihood of the target label (misclassification label) at the region outside of the most discriminative part of $F(x_0, t_0)$. If $\delta$ is refined under the most discriminative region of $F(x_0, t_0)$, then the resulting $\delta_S$ leads to a much larger $\ell_p$ norm ($\ell_2$ distortion is shown in FIG. 6). This example in FIG. 6 further confirms the importance of the found adversarial patterns: attack-specific perturbations highly correspond to the discriminative regions related to either the true label, the target label, or both.

In view of the above, the mechanisms of the illustrative embodiments provide new metrics, i.e. the PSR and IS metrics, to represent the effectiveness of adversarial perturbation based attacks on the operation of computer models, such as neural network based models. The illustrative embodiments further provide a methodology for generating a visualization of these adversarial perturbation attacks that illustrates and explains the effectiveness of such attacks. Through these new metrics and visualization methodologies, it has been shown that the effects of adversarial perturbations are strongly associated with class-specific discriminative image regions localized by CAM. It has also been shown above that the interpretable adversarial patterns can be used to enhance the effectiveness of adversarial perturbations. As will be described in greater detail hereafter, these metrics, methodologies, and observations are an underlying basis for the implementation of an improved computer tool to provide such visualizations as well as automatically generate expanded training data sets and train computer models to be hardened against such attacks.

It should be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims makes use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," as used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the present description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
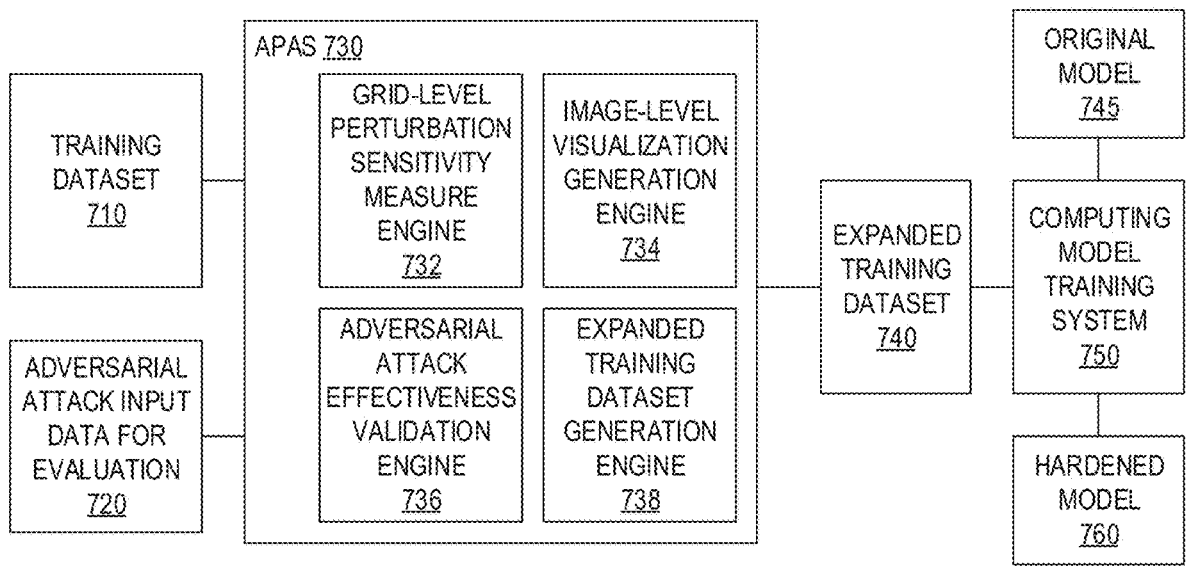
FIG. 7 is an example block diagram illustrating the primary operational elements of an improved computer tool, referred to as an adversarial perturbation attack sensitivity (APAS) visualization and model training, in accordance with one illustrative embodiment.

FIG. 7 is an example block diagram illustrating the primary operational elements of an improved computer tool, referred to as an adversarial perturbation attack sensitivity (APAS) visualization and model training system (or simply APAS for conciseness), in accordance with one illustrative embodiment. The elements shown in FIG. 7 may be implemented in specifically configured hardware configured to perform the associated operations of the elements, software executed on hardware where the software is specifically configured to perform the associated operations of the elements when executed by the hardware, or any combination of such specially configured hardware and executed software. It should be appreciated that, in the case of software executed on hardware, various computer code can be generated to achieve the operations set forth herein in view of the present description and the illustrative embodiments are not limited to any one specific computer code implementation. Moreover, it should be appreciated that other hardware/software elements may be provided to facilitate basic computer functions, such as control, messaging, data transfer, and the like, both within and with external computing devices.

As shown in FIG. 7, the APAS visualization and model training system 730 comprises a grid-level perturbation sensitivity measure engine 732, an image-level visualization generation engine 734, adversarial attack effectiveness validation engine 736, and an expanded training dataset generation engine 738. It should be appreciated that while FIG. 7 shows the computing model training system 750 as a separate entity from the APAS visualization and model training system 730, in other illustrative embodiments, the computing model training system 750 may be integrated in and part of the APAS visualization and model training system 730.

The APAS visualization and model training system 730 receives a training dataset for expansion based on the evaluation of adversarial input effectiveness performed by the APAS visualization and model training system 730. The APAS visualization and model training system 730 further receives an adversarial attack input dataset for evaluation 720. These inputs 710 and 720 may each comprise multiple input data structures representing collections of data for processing by a computer model, e.g., DNN, CNN, cognitive computing system models, or other machine learning models. For example, in some illustrative embodiments, in which image classification is performed by the computer model, the input datasets comprise data structures representing digital images. In this context of image classification, the training dataset 710 comprises the collection of digital images, and their corresponding correct classification labels $t_0$ that are to be generated by a correctly trained computer model based on the digital images as input. The adversarial attack input dataset for evaluation 720 comprises a collection of digital images having one or more perturbations in accordance with one or more adversarial attack methodologies, and a corresponding target label t for misclassification.

The grid-level perturbation sensitivity measure engine 732 provides logic that is configured to evaluate the operation of a computer model, such as a DNN, CNN, cognitive computing system model, or other machine learning model, in response to adversarial inputs. For example, an input image may have various grids, e.g., groups of pixels as described previously, with pixels in the grids perturbed to generate different adversarial input images, e.g., a first adversarial image of the natural image may be generated by perturbing one or more pixels of a first grid of the natural image, whereas a second adversarial image of the natural image may be generated by perturbing one or more pixels of a second grid of the natural image. These adversarial images are processed through the computer model and a CAM of the natural image is generated for use in determining the sensitivity measures and corresponding visualization of the illustrative embodiments.

The sensitivity of the operation of the computer model to adversarial attack perturbations is determined using the logit change $d_{0,i}$ with respect to the true label $t_0$, and the logit change $d_{t,i}$ with respect to the target label t, as described previously. Moreover, promotion-suppression ratio (PSR) measures ($r_i$) for the adversarial attack perturbations are generated based on the logit changes. These metrics permit perturbations to be classified into suppression-dominant, promotion-dominant, and balanced perturbation classifications based on predefined thresholds or ranges of these metrics.

These metrics and/or their classifications, for each perturbation, are then used by the image level visualization generation engine 734 which provides logic to generate a PSR mask overlay for the CAM illustrating the correlation between the perturbations and the determinative regions of the natural image, as well as the suppressive, promotion, or balanced effects of the perturbations. As described previously, the PSR mask represents areas of suppressive, promotion, or balanced effects of perturbations as colored regions overlaying the regions of the CAM, e.g., black, white, and grey areas. The CAM with the PSR mask overlay may be output by the image level visualization generation engine 734 via a graphical user interface display for viewing by a user in order to give greater insights to the user as to the portions of the image that are most effective in adversarial attacks for suppressing correct classification and promoting false classification by the computer model, as well as perturbations in adversarial attacks that are more balanced.

The adversarial attack effectiveness validation engine 736 provides logic for evaluating the combination of the CAM and PSR mask, such as by generating an interpretability score (IS) of the CAM. The IS provides a measure indicating whether or not an adversarial attack is interpretable even if its perturbation cannot be distinguished by human eyes. That is, many small adversarial perturbations yield interpretability, which visually explains why an attack targets certain image regions, even if they are imperceptible to the human eye. Therefore, IS provides a new metric (interpretability), and PSR provides a new metric with regard to promotion/suppression, that may be used to evaluate and compare the performance of different attack methods. IS can help computer systems to defend against adversarial attacks, e.g., reject data with low interpretability on the true label and/or high interpretability on the target label. The IS of the CAM provides a measure of the effectiveness of the perturbations with regard to the CAM regions and may be used to identify which perturbations are most effective in adversarial attacks to cause suppression of the correct computer model output and promotion of the target misclassification by the computer model. Based on the IS measures for the perturbations, perturbations providing a threshold level of interpretability score may be selected as the most influential on the effectiveness of the adversarial attack.

The selected perturbations may be used by the expanded training dataset generation engine 738, which provides logic for automatically generating additional training data structures, such as new training images, in which perturbations corresponding to the selected perturbations are present. For example, noise may be injected into the data of the natural image in a targeted area corresponding to the selected perturbation, to thereby perturb the natural image and generate an adversarial image comprising the selected perturbation. A plurality of additional training data structures, or images in this example implementation, may be generated and added to the training dataset 710 to generate an expanded training dataset 740.

The expanded training dataset 740 is input to the computing model training system 750 which performs machine learning based operations to train the original computing model 745 using the expanded training dataset 740. Since the expanded training dataset 740 comprises images that include adversarial attack perturbations in conjunction with the true label for these images, the original computing model 745 is trained to be more hardened against such adversarial attack perturbations and lessen the sensitivity of the computing model 745 to such adversarial attacks. The computing model training system 750 outputs the hardened computing model 760 for use in processing new input images in accordance with the image classification system in which the hardened computing model 760 is implemented. The hardened computing model 760 may be installed in the computing system that executes the hardened computing model 760 to perform classification operations either alone or in combination with other operations that are performed by the computing system. For example, the computing system may implement a cognitive computing mechanism that utilizes the classification operations of the hardened computing model 760 as one component to the overall cognitive operations performed by the cognitive computing mechanism, e.g., patient treatment recommendation, patient medical image analysis, vehicle navigation and/or obstacle avoidance or other vehicle safety system (e.g., automatic braking, automatic steering, warning notification output via a dashboard or audible warning mechanism, etc.), or the like.

Figure 9:
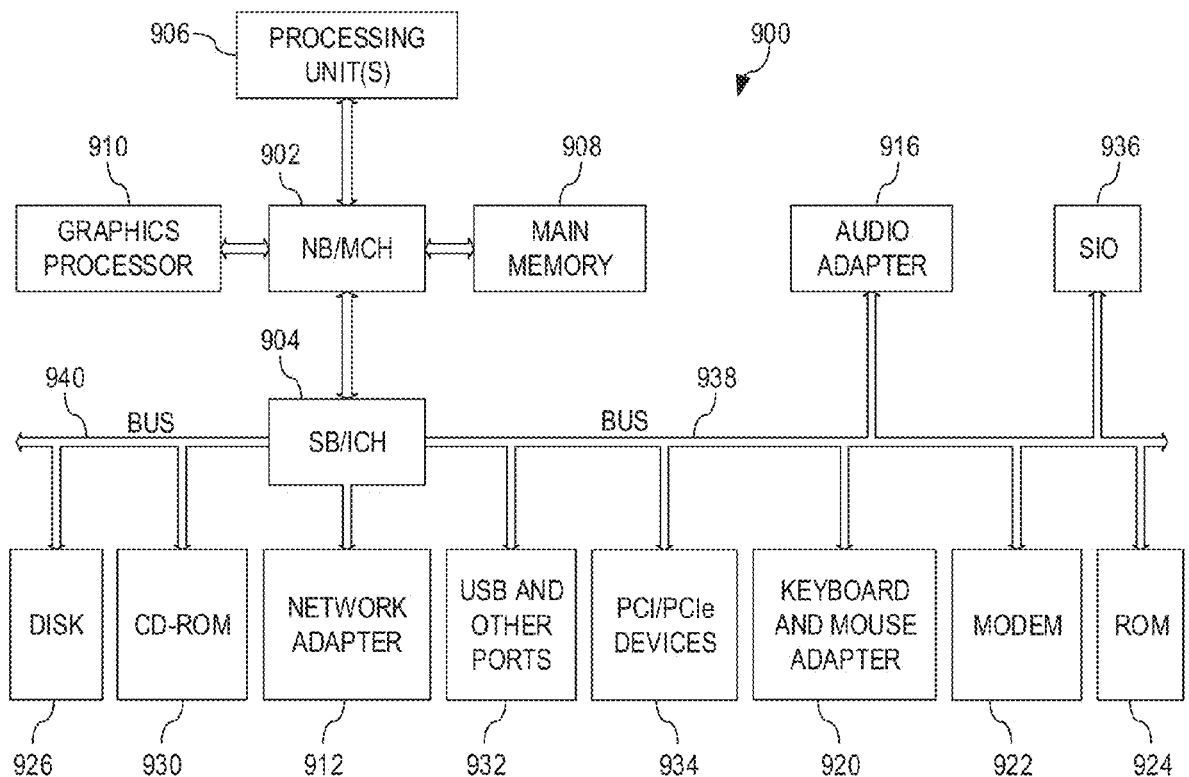
FIG. 9 is a block diagram of an example data processing system in which aspects of the illustrative embodiments are implemented.
Figure 8:
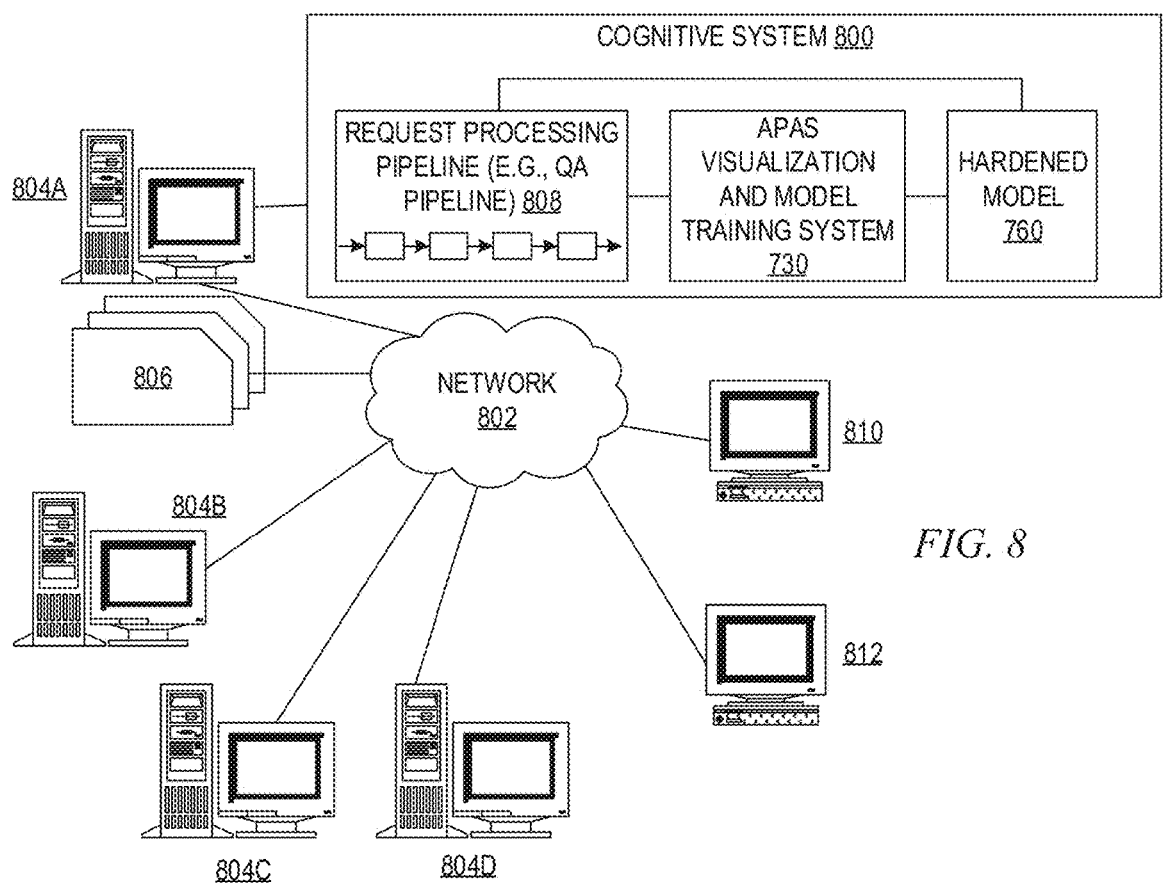
FIG. 8 depicts a schematic diagram of one illustrative embodiment of a distributed data processing system in which aspects of the present invention may be implemented.

The mechanisms of the illustrative embodiments are directed to an improved computer tool that evaluates the effectiveness of adversarial attack perturbations on the operation of a computer model, generate a visualization of the effects of the adversarial attack perturbations for use by a user, and in some illustrative embodiments, automatically generating an expanded training dataset based on the determined effectiveness of the adversarial attack perturbations and training the computer model to harden it against such adversarial attack perturbations. As such, the illustrative embodiments may be utilized in many different types of data processing environments. In order to provide a context for the description of the specific elements and functionality of the illustrative embodiments, FIGS. 8-9 are provided hereafter as example environments in which aspects of the illustrative embodiments may be implemented. It should be appreciated that FIGS. 8-9 are only examples and are not intended to assert or imply any limitation with regard to the environments in which aspects or embodiments of the present invention may be implemented. Many modifications to the depicted environments may be made without departing from the spirit and scope of the present invention.

The mechanisms of the illustrative embodiments may be implemented in and by a computing system specifically configured with the operational elements previously described above with regard to FIG. 7 to thereby render the computing system a specific or special purpose computing system. The computing system may operate solely to evaluate the effectiveness of adversarial attack perturbations on a computer model and provide a visualization of this effectiveness in accordance with the mechanisms of the illustrative embodiments described previously. In other illustrative embodiments, the computing system may operate to also generate an expanded training dataset having additional training data structures representing adversarial attack perturbations found to be most effective in causing misclassification by the computer model, either through suppression of the true label, promoting of the adversarial attack's target label, or both. In still other illustrative embodiments, the computer system may actually perform training of the computer model with the expanded training dataset to thereby harden the computer model against such adversarial attacks. In some illustrative embodiments, these mechanisms, of one or more of these previously mentioned illustrative embodiments, operate in conjunction with or as part of a cognitive computing system that utilizes the computer model to perform classification operations upon which other operations of the cognitive computing system may operate.

With regard to a cognitive computing system architecture, the cognitive computing system implements a request processing pipeline, request processing methodology, and request processing computer program product with which the mechanisms of the illustrative embodiments are implemented. These requests may be provided as structured or unstructured request messages, natural language questions, or any other suitable format for requesting an operation to be performed by the cognitive system. In some illustrative embodiments, the requests may be in the form of input data sets that are to be classified in accordance with a cognitive classification operation performed by a machine learning, neural network, deep learning, or other artificial intelligence based model that is implemented by the cognitive system. The input data sets may represent various types of input data depending upon the particular implementation, such as audio input data, image input data, textual input data, or the like. For example, in one possible implementation, the input data set may represent a medical image, such as an x-ray image, CT scan image, MRI image, or the like, that is to have portions of the image, or the image as a whole, classified into one or more predefined classifications. In other possible implementations, the input data set may represent facial images, images of text, biometric images, camera captured images of an environment, such as in a vehicle mounted camera system, natural language textual content, or any other type of input that may be represented as data and for which a classification operation is to be performed so as to perform a cognitive operation by a cognitive system.

It should be appreciated that classification of input data may result in a labeled set of data that has labels or annotations representing the corresponding classes into which the non-labeled input data set is classified. This may be an intermediate step in performing other cognitive operations by the cognitive system that support decision making by human users, e.g., the cognitive system may be a decision support system, or by other automated mechanisms, such as vehicle control and/or safety systems. For example, in a medical domain, the cognitive system may operate to perform medical image analysis to identify anomalies for identification to a clinician, patient diagnosis and/or treatment recommendation, drug interaction analysis, or any of a plethora of other possible decision support operations. In a security domain, the cognitive system may operate to control access to physical premises, data assets, computing assets, or any other type of asset to which access is to be restricted. In a vehicle control and/or safety system, the cognitive system may operate to control other systems of the vehicle to maintain the safety of the vehicle and its passengers, such as automatic braking, steering, and the like. In other domains, the cognitive system may perform different types of decision making operations or decision support operations based on the desired implementation.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests, depending on the desired implementation. For example, in some cases, a first request processing pipeline may be trained to operate on input requests directed to a medical image analysis, while a second request processing pipeline may be configured and trained to operate on input requests concerning patient electronic medical record (EMR) analysis involving natural language processing. In other cases, for example, the request processing pipelines may be configured to provide different types of cognitive functions or support different types of applications, such as one request processing pipeline being used for patient treatment recommendation generation, while another pipeline may be trained for financial industry based forecasting, etc.

Moreover, each request processing pipeline may have their own associated corpus or corpora that they ingest and operate on, e.g., one corpus for medical treatment documents and another corpus for financial industry domain related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

The illustrative embodiments may be integrated in, augment, and extend the functionality of these request processing pipeline by providing mechanisms to evaluate and visualize the effectiveness of adversarial attacks on the computer models used by the request processing pipeline or cognitive computing system as a whole, and potentially protect the computer models implemented in these pipelines, or by the cognitive system as a whole, from adversarial attacks by providing an expanded training dataset and training of the computer models to harden them against such adversarial attacks. In particular, in portions of the cognitive system in which the trained neural network models, machine learning models, deep learning models, or the like, are employed to generate labeled data set outputs, the mechanisms of the illustrative embodiments may be implemented to train the neural network or other machine learning or cognitive model so as to introduce noise into the input data structures of the training dataset and training the computer model to properly classify the input image even in the presence of such adversarial attack perturbations.

As the mechanisms of the illustrative embodiments may be part of a cognitive system and may improve the operation of the cognitive system by protecting it from adversarial attacks through hardening of the computer models against such adversarial attacks, it is important to have an understanding of how cognitive systems implementing a request processing pipeline is implemented. It should be appreciated that the mechanisms described in FIGS. 8-9 are only examples and are not intended to state or imply any limitation with regard to the type of cognitive system mechanisms with which the illustrative embodiments are implemented. Many modifications to the example cognitive system shown in FIGS. 8-9 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. This logic may implement one or more computer models, such as a neural network model, a machine learning model, a deep learning model, that may be trained for particular purposes for supporting the particular cognitive operations performed by the cognitive system. In accordance with the mechanisms of the illustrative embodiments, the logic further implements an APAS visualization and model training system, such as the APAS visualization and model training system 730 described above with regard to FIG. 7, for evaluating the effectiveness of adversarial attacks on the computer models, and in some cases actually generate an expanded training dataset and training the computer model to be hardened against such adversarial attacks. In this way, the hardened model engine fortifies the cognitive computing system from adversarial attacks.

The logic of the cognitive system implements the cognitive computing operation(s), examples of which include, but are not limited to, question answering, identification of related concepts within different portions of content in a corpus, security operations for controlling access to premises or assets, intelligent search algorithms, such as Internet web page searches, for example, medical diagnostic and treatment recommendations, other types of recommendation generation, e.g., items of interest to a particular user, potential new contact recommendations, etc., image analysis, audio analysis, vehicle system controls, and the like. The types and number of cognitive operations that may be implemented using the cognitive system of the illustrative embodiments are vast and cannot all be documented herein. Any cognitive computing operation emulating decision making and analysis performed by human beings, but in an artificial intelligence or cognitive computing manner, is intended to be within the spirit and scope of the present invention.

IBM Watson™ is an example of one such cognitive computing system which can process human readable language and identify inferences between text passages with human-like high accuracy at speeds far faster than human beings and on a larger scale. In general, such cognitive systems are able to perform the following functions:

- Navigate the complexities of human language and understanding
- Ingest and process vast amounts of structured and unstructured data
- Generate and evaluate hypothesis
- Weigh and evaluate responses that are based only on relevant evidence
- Provide situation-specific advice, insights, and guidance
- Improve knowledge and learn with each iteration and interaction through machine learning processes
- Enable decision making at the point of impact (contextual guidance)
- Scale in proportion to the task
- Extend and magnify human expertise and cognition
- Identify resonating, human-like attributes and traits from natural language
- Deduce various language specific or agnostic attributes from natural language
- High degree of relevant recollection from data points (images, text, voice) (memorization and recall)
- Predict and sense with situational awareness that mimic human cognition based on experiences
- Answer questions based on natural language and specific evidence In one aspect, cognitive computing systems (or simply "cognitive systems") provide mechanisms for processing input data to perform a cognitive operation, such as answering questions posed to these cognitive systems and/or process requests which may or may not be posed as natural language questions. The request processing pipeline and/or cognitive computing system comprises one or more artificial intelligence applications executing on data processing hardware that process requests, which may be formulated in structured or unstructured manner, as input data with implied requests for performance of the cognitive operations, or the like. The request processing pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the request processing pipeline. The document may include any file, text, article, or source of data for use in the cognitive computing system. For example, a request processing pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain. In some illustrative embodiments, the corpus or corpora may comprise image data for processing by the cognitive computing system, and in accordance with the mechanisms described above, may include a training dataset and adversarial attack input data for evaluation.

Content users, which may be human beings or automated computing systems, input requests to the cognitive system which implements the request processing pipeline. The request processing pipeline then processes the requests using the content in the corpus of data by evaluating documents, sections of documents, portions of data in the corpus, images, or the like. When a process evaluates a given section of a document for semantic content, the process can use a variety of conventions to query such document from the request processing pipeline, e.g., sending the query to the request processing pipeline as a well-formed question which is then interpreted by the request processing pipeline and a response is provided. Semantic content is content based on the relation between signifiers, such as words, phrases, signs, and symbols, and what they stand for, their denotation, or connotation. In other words, semantic content is content that interprets an expression, such as by using Natural Language Processing.

The request processing pipeline receives an input, parses the input to extract the major features of the input, uses the extracted features to formulate queries, and then applies those queries to the corpus of data. Based on the application of the queries to the corpus of data, the request processing pipeline generates a set of hypotheses, or candidate results, by looking across the corpus of data for portions of the corpus of data that have some potential for containing a valuable response to the input and expressed or implied request. The request processing pipeline then performs deep analysis on the content of the input and each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, image analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity. Still others may perform image processing and classification operations on input images in the input request to thereby classify the image into one of a plurality of predefined image classifications using a computer model, such as a DNN, CNN, or other machine learning computer model.

The scores obtained from the various reasoning algorithms indicate the extent to which the potential response is inferred by the input based on the specific area of focus of that reasoning algorithm. Each resulting score is then weighted against a statistical model. The statistical model captures how well the reasoning algorithm performed at establishing the inference between two similar portions of content for a particular domain during the training period of the request processing pipeline. The statistical model is used to summarize a level of confidence that the request processing pipeline has regarding the evidence that the potential response is inferred by the input. This process is repeated for each of the candidate results until the request processing pipeline identifies candidate results that surface as being significantly stronger than others and thus, generates a final result, or ranked set of results, for the input request, which in some implementations may be a control signal sent to other computer systems, actuators, or other electronics to control the operation of another system, e.g., in a vehicle control and safety system, the result may be a control signal sent to an automatic braking system, automatic steering system, obstacle avoidance system, dashboard warning systems, or the like.

FIG. 8 depicts a schematic diagram of one illustrative embodiment of a distributed data processing system in which a cognitive computing system 800 implementing a request processing pipeline 808 is provided in a computer network 802. While the cognitive computing system 800 may be configured for a variety of different purposes depending on the desired implementation, e.g., image analysis, facial recognition, vehicle control, question answering, cognitive content searches, and the like, it will be assumed for purposes of the present description that the cognitive computing system 800 is configured to perform image analysis operations, which may include any image analysis operations including, but not limited to, facial recognition, biometric based access control, e.g., fingerprint or retina scan access control, camera based object identification and corresponding controls, such as vehicle controls, or the like. In the case of a vehicle control mechanism, the cognitive computing system may be implemented in an on-board computing system of the vehicle and thus, may operate wirelessly from the other depicted computing systems in FIG. 8.

The cognitive system 800 is implemented on one or more computing devices 804A-D (comprising one or more processors and one or more memories, and potentially any other computing device elements generally known in the art including buses, storage devices, communication interfaces, and the like) connected to the computer network 802. For purposes of illustration only, FIG. 8 depicts the cognitive system 800 being implemented on computing device 804A only, but as noted above the cognitive system 800 may be distributed across multiple computing devices, such as a plurality of computing devices 804A-D. The network 802 includes multiple computing devices 804A-D, which may operate as server computing devices, and 810-812 which may operate as client computing devices, in communication with each other and with other devices or components via one or more wired and/or wireless data communication links, where each communication link comprises one or more of wires, routers, switches, transmitters, receivers, or the like. Other embodiments of the cognitive system 800 may be used with components, systems, sub-systems, devices other than those that are depicted herein.

The cognitive computing system 800 is configured to implement a request processing pipeline 808 that receive inputs from various sources. The requests may be posed in the form of a structured or unstructured (e.g., natural language) requests for the performance of a cognitive operation, or the like. Alternatively, the "request" may simply be the input of data that is intended to be operated on by the cognitive computing system 800, e.g., images, text, audio input, or the like, which is to be classified by the hardened model of the illustrative embodiments and then operated on by cognitive processes to generate a result of a cognitive operation. For example, the cognitive system 800 receives input from the network 802, a corpus or corpora of electronic documents 806, cognitive system users, image capture devices, audio capture devices, biometric scanners, textual message interception devices, and/or other data sources and other possible sources of input.

In one embodiment, some or all of the inputs to the cognitive system 800 are routed through the network 802. The various computing devices 804A-D on the network 802 include access points for content creators and cognitive system users, both of which may be human creators/users or other computing systems operating automatically, semi-automatically, or with manual intervention by a user. Some of the computing devices 804A-D include devices for a database storing the corpus or corpora of data 806 (which is shown as a separate entity in FIG. 8 for illustrative purposes only). Portions of the corpus or corpora of data 806 may also be provided on one or more other network attached storage devices, in one or more databases, or other computing devices not explicitly shown in FIG. 8. The network 802 includes local network connections and remote connections in various embodiments, such that the cognitive system 800 may operate in environments of any size, including local and global, e.g., the Internet.

Depending on the particular domain and implementation of the cognitive system, the corpus or corpora of data 806 may take many different forms. In a natural language implementation, the corpus or corpora 806 may be composed of natural language unstructured documents, structured documents, or the like. In a domain in which image analysis is being performed, the corpus or corpora 806 may include image data for various types of entities. In an audio analysis domain, the corpus or corpora 806 may contain audio patterns representing different entities or sources of audible sounds. The content of the corpus or corpora 806 may vary depending on the type of data needed to perform cognitive operations.

In one embodiment, the content creator creates content in a document of the corpus or corpora of data 806 for use as part of a corpus of data with the cognitive system 800. The document includes any file, text, article, or source of data for use in the cognitive system 800. Cognitive system users access the cognitive system 800 via a network connection or an Internet connection to the network 802, and input requests to the cognitive system 800 that are processed based on the content in the corpus or corpora of data 806. The cognitive system 800 parses and interprets the request via the request processing pipeline 808, and provides a response to the cognitive system user, e.g., cognitive system user 810, containing one or more results of processing the request. In some embodiments, the cognitive system 800 provides a response to users in a ranked list of candidate responses while in other illustrative embodiments, the cognitive system 800 provides a single final response or a combination of a final response and ranked listing of other candidate responses.

The cognitive system 800 implements the pipeline 808 which comprises a plurality of stages for processing an input request based on information obtained from the corpus or corpora of data 806. The pipeline 808 generates responses for the input request based on the processing of the input request and the corpus or corpora of data 806.

In some illustrative embodiments, the cognitive system 800 may be the IBM Watson™ cognitive system available from International Business Machines Corporation of Armonk, N.Y., which is augmented with the mechanisms of one or more of the illustrative embodiments described herein. More information about the request processing pipeline of the IBM Watson™ cognitive system may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 800 from a client device may be posed in the form of a structured or unstructured (e.g., natural language) requests. That is, the input may be formatted or structured as any suitable type of request, or simply as a set of input data to be processed, which may be parsed and analyzed using structured and/or unstructured input analysis, including but not limited to natural language parsing and analysis mechanisms of a cognitive system such as IBM Watson™, to determine the basis upon which to perform cognitive analysis and providing a result of the cognitive analysis. Such processing may alternatively, or in addition, include image analysis, audio analysis, textual image analysis, biometrics analysis, or any other type of cognitive analysis that utilizes neural network, machine learning, or other cognitive models which may be trained and hardened against adversarial attacks in accordance with the illustrative embodiments.

The processing of the request involves the application of a trained model, e.g., neural network model, machine learning model, deep learning (cognitive) model, etc., to an input data set as described previously above. This input data set may represent features of the actual request itself, data submitted along with the request upon which processing is to be performed, or the like. The application of the trained model to an input data set may occur at various points during the performance of the cognitive computing operations by the cognitive system. For example, the trained model may be utilized during feature extraction and classification by a feature extraction stage of processing of the request, e.g., taking a natural language term in the request and classifying it as one of a plurality of possible concepts that the term corresponds to, e.g., classifying the term "truck" in an input request into a plurality of possible classes, one of which may be "vehicle". As another example, a portion of an image comprising a plurality of pixel data may have the trained model applied to it to determine what the object is that is in the portion of the image or classify the image as a whole. The mechanisms of the illustrative embodiments operate on the computer models themselves to evaluate their sensitivity to adversarial attacks and potentially harden them against such adversarial attacks, where the operation of the computer models may be an intermediate operation within the overall cognitive system's cognitive computing operations, e.g., classification of a portion of a medical image into one of a plurality of different anatomical structures may be an intermediate operation to performing an anomaly identification and treatment recommendation cognitive computing operation.

As shown in FIG. 8, the cognitive system 800 is further augmented, in accordance with the mechanisms of the illustrative embodiments, to include an APAS visualization and model training system 730, such as described previously with regard to FIG. 7, which operates on one or more computer models implemented in the request processing pipeline 808 to thereby evaluate their sensitivity to adversarial attacks, i.e. the effects of perturbations implemented by the adversarial attacks on proper classification or misclassification of the computer models, and potentially harden the computer models against such attacks to generate hardened models 760. It should be appreciated that the depicted example assumes an embodiment where the APAS visualization and model training system 730 incorporates the computing model training system 750 of FIG. 7 in order to generate the hardened model 760.

The APAS visualization and model training system 730 may be provided as an external engine to the logic implementing the trained model 760. The APAS visualization and model training system 730 operates to evaluate sensitivity measures of a computer model to particular adversarial attack perturbations and generate a CAM representation of the computer model operation with a sensitivity mask, e.g., the PSR mask described previously, overlay on the CAM to identify regions of input where the computer model relies on the region to perform its classification, which correlate with areas where the computing model has a predetermined level of sensitivity to perturbations that suppress the true label, promote a misclassification label (target label), or have a balanced effect of both suppression and promotion. The APAS visualization and model training system 730 may further modify and re-train or create a new protected computer model, e.g., neural network model, based on a given trained neural network, i.e. generate a hardened model 760. This is accomplished, as described above, by re-training the computer model, e.g., neural network, using an expanded training dataset having additional training data structures which implement selected adversarial attack perturbations selected based on the evaluation of the sensitivity of the computing model. The resulting hardened model 760 is trained to properly classify and output corresponding labels for input data even in the presence of such perturbations of adversarial attacks. Thus, correct classification and labeling of the input data set is still performed while protecting or hardening the computer model (e.g., neural network) against adversarial attacks, such as evasion attacks. The resulting classified or labeled data set may be provided to further stages of processing downstream in the request processing pipeline 408 for further processing and performance of the overall cognitive operation for which the cognitive system 400 is employed.

It should be appreciated that while FIG. 8 illustrates the implementation of APAS visualization and model training system 730 and the trained and hardened model logic 760 as part of a cognitive system 800, the illustrative embodiments are not limited to such. Rather, in some illustrative embodiments, the APAS visualization and model training system 730 and hardened model logic 760 may themselves be provided as a service from which a user of a client computing device 810, may request processing of an input data set. Moreover, other providers of services, which may include other cognitive systems, may utilize the APAS visualization and model training system 730 and/or hardened model 760 to augment the operation of their own cognitive systems. Thus, in some illustrative embodiments the APAS visualization and model training system 730 and/or hardened model logic 760 may be implemented in one or more server computing devices, accessed via one or more APIs via other computing devices through which input data sets are submitted to the APAS visualization and model training system 730 and/or hardened model logic 760, and corresponding visualizations of sensitivities of computing models, expanded training datasets, trained or hardened computer models (such as from the APAS 730), and/or correctly labeled data sets (such as from the hardened model 760) are returned. Thus, the integration of the mechanisms of the illustrative embodiments into a cognitive system 800 is not required, but may be performed depending on the desired implementation.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 9 is provided as an example of one type of data processing system in which aspects of the present invention may be implemented. Many other types of data processing systems may be likewise configured to specifically implement the mechanisms of the illustrative embodiments.

FIG. 9 is a block diagram of an example data processing system in which aspects of the illustrative embodiments are implemented. Data processing system 900 is an example of a computer, such as a server computing device 804A-D or client computing device 810 in FIG. 4, in which computer usable code or instructions implementing the processes for illustrative embodiments of the present invention are located. In one illustrative embodiment, FIG. 9 represents a server computing device, such as a server 804A, which implements a cognitive system 800 and request processing pipeline 808 augmented to include the additional mechanisms of the illustrative embodiments described herein with regard to FIG. 7 for evaluating the sensitivity of a computer model to adversarial attack perturbations, generating a visualization of such sensitivities, generating an expanded training dataset, and/or training the computer model to harden it against such adversarial attacks.

In the depicted example, data processing system 900 employs a hub architecture including north bridge and memory controller hub (NB/MCH) 902 and south bridge and input/output (I/O) controller hub (SB/ICH) 904. Processing unit 906, main memory 908, and graphics processor 910 are connected to NB/MCH 902. Graphics processor 910 is connected to NB/MCH 902 through an accelerated graphics port (AGP).

In the depicted example, local area network (LAN) adapter 912 connects to SB/ICH 904. Audio adapter 916, keyboard and mouse adapter 920, modem 922, read only memory (ROM) 924, hard disk drive (HDD) 926, CD-ROM drive 930, universal serial bus (USB) ports and other communication ports 932, and PCI/PCIe devices 934 connect to SB/ICH 904 through bus 938 and bus 940. PCI/PCIe devices may include, for example, Ethernet adapters, add-in cards, and PC cards for notebook computers. PCI uses a card bus controller, while PCIe does not. ROM 924 may be, for example, a flash basic input/output system (BIOS).

HDD 926 and CD-ROM drive 930 connect to SB/ICH 904 through bus 940. HDD 926 and CD-ROM drive 930 may use, for example, an integrated drive electronics (IDE) or serial advanced technology attachment (SATA) interface. Super I/O (SIO) device 936 is connected to SB/ICH 904.

An operating system runs on processing unit 906. The operating system coordinates and provides control of various components within the data processing system 900 in FIG. 9. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 900.

As a server, data processing system 900 may be, for example, an IBM® eServer™ System p° computer system, running the Advanced Interactive Executive (AIX®) operating system or the LINTJX® operating system. Data processing system 900 may be a symmetric multiprocessor (SMP) system including a plurality of processors in processing unit 906. Alternatively, a single processor system may be employed.

Instructions for the operating system, the object-oriented programming system, and applications or programs are located on storage devices, such as HDD 926, and are loaded into main memory 908 for execution by processing unit 906. The processes for illustrative embodiments of the present invention are performed by processing unit 906 using computer usable program code, which is located in a memory such as, for example, main memory 908, ROM 924, or in one or more peripheral devices 926 and 930, for example.

A bus system, such as bus 938 or bus 940 as shown in FIG. 9, is comprised of one or more buses. Of course, the bus system may be implemented using any type of communication fabric or architecture that provides for a transfer of data between different components or devices attached to the fabric or architecture. A communication unit, such as modem 922 or network adapter 912 of FIG. 9, includes one or more devices used to transmit and receive data. A memory may be, for example, main memory 908, ROM 924, or a cache such as found in NB/MCH 902 in FIG. 9.

Those of ordinary skill in the art will appreciate that the hardware depicted in FIGS. 8 and 9 may vary depending on the implementation. Other internal hardware or peripheral devices, such as flash memory, equivalent non-volatile memory, or optical disk drives and the like, may be used in addition to or in place of the hardware depicted in FIGS. 8 and 9. Also, the processes of the illustrative embodiments may be applied to a multiprocessor data processing system, other than the SMP system mentioned previously, without departing from the spirit and scope of the present invention.

Moreover, the data processing system 900 may take the form of any of a number of different data processing systems including client computing devices, server computing devices, a tablet computer, laptop computer, telephone or other communication device, a personal digital assistant (PDA), or the like. In some illustrative examples, data processing system 900 may be a portable computing device that is configured with flash memory to provide non-volatile memory for storing operating system files and/or user-generated data, for example. Essentially, data processing system 900 may be any known or later developed data processing system without architectural limitation.

Figure 10:
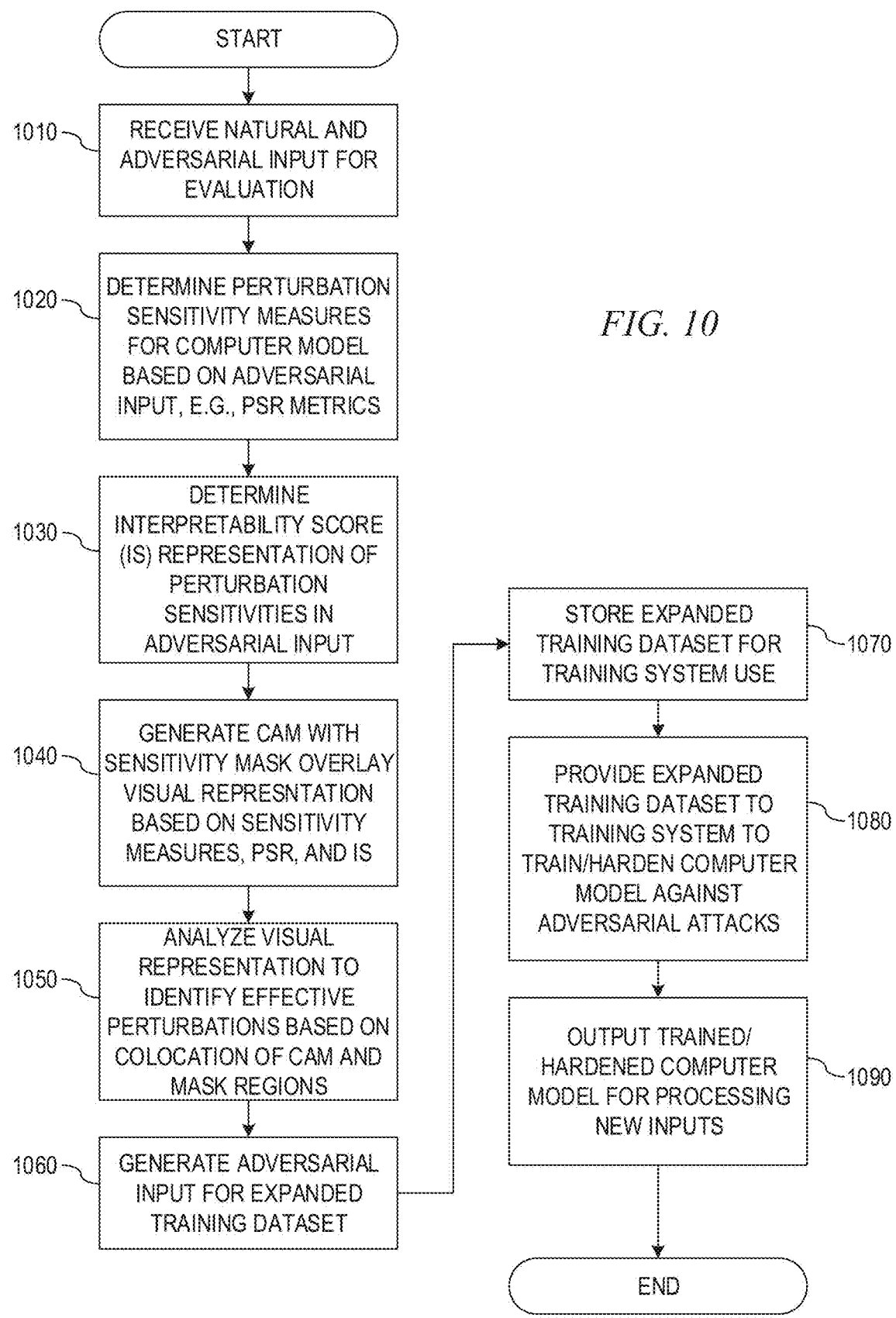
FIG. 10 is a flowchart outlining an example operation for evaluating the sensitivity of a computer model to adversarial attack perturbations, generating a visualization of such sensitivity, and potentially hardening the computer model against such adversarial attacks in accordance with one illustrative embodiment.

FIG. 10 is a flowchart outlining an example operation for evaluating the sensitivity of a computer model to adversarial attack perturbations, generating a visualization of such sensitivity, and potentially hardening the computer model against such adversarial attacks in accordance with one illustrative embodiment.

As shown in FIG. 10, the operation starts by receiving an adversarial input dataset for evaluation along with a corresponding training dataset (step 1010). The sensitivity of the computer model to the adversarial attack(s) represented in the adversarial input dataset is determined using the sensitivity measures and PSR metrics for perturbations in the data structures of the adversarial input dataset described previously above (step 1020). The interpretability score (IS) representation of the perturbations is determined as described previously (step 1030) and a CAM with sensitivity mask overlay, e.g., the PSR overlay, visual representation is generated based on the sensitivity measures, PSR metrics, and IS of the adversarial attack perturbations (step 1040). The visual representation may be output to a user via a graphical user interface or the like, to demonstrate to the user the correlation of the determinative regions represented in the CAM with the classification of adversarial attack perturbations on the output labels generated by the computer model, e.g., suppression-dominant, promotion-dominant, or balanced perturbation classifications.

In addition, in some illustrative embodiments, the visualization generated may be further analyzed to identify and select perturbations having a predetermined level of effectiveness, with regard to suppression and/or promotion, on the operation of the computer model, e.g., a predetermined threshold PSR and/or IS (step 1150). The selected perturbations are then used to generate adversarial inputs from the training dataset by introducing similar perturbations into data structures of the training dataset to thereby generate additional adversarial inputs and expand the training dataset (step 1160). The expanded training dataset, comprising the original training dataset and additional adversarial input data structures, may be stored for use in training the computer model to harden it against adversarial attacks (step 1170). The expanded training data set may then be provided to a computer model training system to train/harden the computer model against adversarial attacks (step 1180). The resulting trained/hardened computer model is then output for runtime operation to process other input data (step 1190). The operation then terminates.

It should be appreciated that the above description is for illustrative purposes only and many modifications to the embodiments described above may be made without departing from the spirit and scope of the present invention. For example, there are various mechanisms that may be utilized to prevent the correct computation of gradients in the illustrative embodiments. For example, more or less layers may be utilized in the neural network to thereby provide simpler or more complex implementations. For example, embodiments may include additional layers, instead of two sets of outputs, may be provided with merging of the outputs in a later layer. In some embodiments, a single set of outputs nodes may be provided but trained with noisy samples and multiple layers making onion like shape loss surface with multiple ups and downs so that the gradients point to local optima. Also, some embodiments can build noisy samples with or without a confusion matrix, and instead use random labels, or those labels with large difference in the input space (e.g., give the label of images that are the most different from the class). Various other types of modifications may be utilized without departing from the spirit and scope of the present invention.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor to specifically configure the at least one processor to implement an adversarial perturbation attack sensitivity (APAS) visualization system, the method comprising:
   receiving, by the APAS visualization system implemented by the at least one processor, a natural input dataset and a corresponding adversarial attack input dataset for evaluation by the APAS visualization system, wherein data structures of the adversarial attack input dataset comprise perturbations intended to cause a misclassification by a computer model;
   determining, by the APAS visualization system, at least one sensitivity measure of the computer model to the perturbations in the adversarial attack input dataset based on a processing of the natural input dataset and corresponding adversarial attack input dataset by the computer model;
   generating, by the APAS visualization system, a classification activation map (CAM) for the computer model based on results of the processing of the natural input dataset and adversarial attack input dataset;
   generating, by the APAS visualization system, a sensitivity overlay based on the at least one sensitivity measure, wherein the sensitivity overlay graphically represents different classifications of perturbation sensitivities;
   applying, by the APAS visualization system, the sensitivity overlay to the CAM to generate a graphical visualization output of the computer model sensitivity to perturbations of adversarial attacks; and
   outputting, by the APAS visualization system, the graphical visualization output to a user computing device for visual display to a user.

2. The method of claim 1, wherein the different classifications of perturbation sensitivities graphically represented by the sensitivity overlay comprises a first classification indicating promotion dominated perturbations which promote an output of the computer model corresponding to a target output of the adversarial attack input dataset, and a second classification indicating suppression dominated perturbations which suppress the output of the computer model corresponding to a true output of the natural input dataset.

3. The method of claim 1, further comprising:
   modifying, by an expanded training dataset generation engine, a training dataset for training the computer model based on the generated sensitivity overlay, to generate an expanded training dataset; and
   outputting the expanded training dataset to a computing model training system that trains the computer model based on the expanded training dataset.

4. The method of claim 3, wherein modifying the training data set comprises:
   generating, by the expanded training dataset generation engine, at least one adversarial version of one or more natural input datasets in the training dataset by introducing one or more perturbations into the natural input dataset in one or more areas identified in the sensitivity overlay as having a specified classification of perturbation sensitivity; and
   adding, by the expanded training dataset generation engine, the at least one adversarial version of the one or more natural input datasets to the training dataset to generate the expanded training dataset.

5. The method of claim 3, further comprising:
   executing, by the computing model training system, a machine learning operation on the computer model based on the expanded training dataset to train the computer model to be hardened against adversarial attacks.

6. The method of claim 1, wherein determining at least one sensitivity measure of the computer model to the perturbations in the adversarial attack input dataset based on a processing of the natural input dataset and corresponding adversarial attack input dataset by the computer model comprises measuring an effect on an output of the computer model made by the presence, or lack thereof, of one or more perturbations in the corresponding adversarial attack input dataset by identifying a change in logit scores in the computer model at one or more granularities comprising at least one of pixel-level, grid-level, or image-level granularities.

7. The method of claim 1, wherein determining at least one sensitivity measure of the computer model to perturbations in the adversarial attack input dataset comprises generating a promotion-suppression ratio (PSR) for each perturbation in the adversarial attack input dataset, and wherein the PSR is a measure of the promotion effects and suppression effects of a corresponding perturbation on misclassification of the computer model.

8. The method of claim 7, wherein determining at least one sensitivity measure of the computer model further comprises generating an interpretability score to quantify interpretability of adversarial perturbations.

9. The method of claim 1, wherein the computer model performs image analysis and classification operations to classify an input image into one of a plurality of predetermined classifications, wherein the natural input dataset is a digital image without a perturbation being introduced into the digital image, and the adversarial attack input dataset is the digital image with one or more perturbations introduced into the natural input dataset, and wherein the graphical visualization output presents a CAM comprising the digital image with regions highlighted to identify areas having different levels of influence on an output of the computer model, and the sensitivity overlay indicating areas where the computer model has different classifications of sensitivity to perturbations.

10. The method of claim 5, wherein generating the at least one adversarial version of one or more natural input datasets in the training dataset, adding the at least one adversarial version of the one or more natural input datasets to the training dataset to generate the expanded training dataset, and executing the machine learning operation on the computer model based on the expanded training dataset are performed automatically.

11. A computer program product comprising a non-transitory computer readable storage medium having a computer readable program stored therein, wherein the computer readable program, when executed on a data processing system, causes the data processing system to implement an adversarial perturbation attack sensitivity (APAS) visualization system that operates to:

receive a natural input dataset and a corresponding adversarial attack input dataset for evaluation by the APAS visualization system, wherein data structures of the adversarial attack input dataset comprise perturbations intended to cause a misclassification by a computer model;

determine at least one sensitivity measure of the computer model to the perturbations in the adversarial attack input dataset based on a processing of the natural input dataset and corresponding adversarial attack input dataset by the computer model;

generate a classification activation map (CAM) for the computer model based on results of the processing of the natural input dataset and adversarial attack input dataset;

generate a sensitivity overlay based on the at least one sensitivity measure, wherein the sensitivity overlay graphically represents different classifications of perturbation sensitivities;

apply the sensitivity overlay to the CAM to generate a graphical visualization output of the computer model sensitivity to perturbations of adversarial attacks; and output the graphical visualization output to a user computing device for visual display to a user.

12. The computer program product of claim 11, wherein the different classifications of perturbation sensitivities graphically represented by the sensitivity overlay comprises a first classification indicating promotion dominated perturbations which promote an output of the computer model corresponding to a target output of the adversarial attack input dataset, and a second classification indicating suppression dominated perturbations which suppress the output of the computer model corresponding to a true output of the natural input dataset.

13. The computer program product of claim 11, wherein the computer readable program further causes the APAS visualization system to:

modify, by an expanded training dataset generation engine, a training dataset for training the computer model based on the generated sensitivity overlay, to generate an expanded training dataset; and output the expanded training dataset to a computing model training system that trains the computer model based on the expanded training dataset.

14. The computer program product of claim 13, wherein the computer readable program further causes the APAS visualization system to modify the training data set at least by:

generating, by the expanded training dataset generation engine, at least one adversarial version of one or more natural input datasets in the training dataset by introducing one or more perturbations into the natural input dataset in one or more areas identified in the sensitivity overlay as having a specified classification of perturbation sensitivity; and adding, by the expanded training dataset generation engine, the at least one adversarial version of the one or more natural input datasets to the training dataset to generate the expanded training dataset.

15. The computer program product of claim 13, wherein the computer readable program further causes the APAS visualization system to:

execute, by the computing model training system, a machine learning operation on the computer model based on the expanded training dataset to train the computer model to be hardened against adversarial attacks.

16. The computer program product of claim 11, wherein determining at least one sensitivity measure of the computer model to the perturbations in the adversarial attack input dataset based on a processing of the natural input dataset and corresponding adversarial attack input dataset by the computer model comprises measuring an effect on an output of the computer model made by the presence, or lack thereof, of one or more perturbations in the corresponding adversarial attack input dataset by identifying a change in logit scores in the computer model at one or more granularities comprising at least one of pixel-level, grid-level, or image-level granularities.

17. The computer program product of claim 11, wherein determining at least one sensitivity measure of the computer model to perturbations in the adversarial attack input dataset comprises generating a promotion-suppression ratio (PSR) for each perturbation in the adversarial attack input dataset, and wherein the PSR is a measure of the promotion effects and suppression effects of a corresponding perturbation on misclassification of the computer model.

18. The computer program product of claim 17, wherein determining at least one sensitivity measure of the computer model further comprises generating an interpretability score to quantify interpretability of adversarial perturbations.

19. The computer program product of claim 11, wherein the computer model performs image analysis and classification operations to classify an input image into one of a plurality of predetermined classifications, wherein the natural input dataset is a digital image without a perturbation being introduced into the digital image, and the adversarial attack input dataset is the digital image with one or more perturbations introduced into the natural input dataset, and wherein the graphical visualization output presents a CAM comprising the digital image with regions highlighted to identify areas having different levels of influence on an output of the computer model, and the sensitivity overlay indicating areas where the computer model has different classifications of sensitivity to perturbations.

20. An apparatus comprising:

at least one processor; and at least one memory coupled to the at least one processor, wherein the at least one memory comprises instructions which, when executed by the at least one processor, cause the at least one processor to implement an adversarial perturbation attack sensitivity (APAS) visualization system that operates to:

receive a natural input dataset and a corresponding adversarial attack input dataset for evaluation by the APAS visualization system, wherein data structures of the adversarial attack input dataset comprise perturbations intended to cause a misclassification by a computer model;

determine at least one sensitivity measure of the computer model to the perturbations in the adversarial attack input dataset based on a processing of the natural input dataset and corresponding adversarial attack input dataset by the computer model;

generate a classification activation map (CAM) for the computer model based on results of the processing of the natural input dataset and adversarial attack input dataset;
generate a sensitivity overlay based on the at least one sensitivity measure, wherein the sensitivity overlay graphically represents different classifications of perturbation sensitivities;
apply the sensitivity overlay to the CAM to generate a graphical visualization output of the computer model sensitivity to perturbations of adversarial attacks; and
output the graphical visualization output to a user computing device for visual display to a user.

* * * * *